(12) United States Patent
Landon

(10) Patent No.: US 6,746,700 B1
(45) Date of Patent: Jun. 8, 2004

(54) CARAMEL CORN PRODUCT AND A METHOD OF MAKING THE CARAMEL CORN PRODUCT

(75) Inventor: Todd Landon, Mound, MN (US)

(73) Assignee: Land O'Lakes, Inc., Arden HIlls, MN (US)

(*) Notice: Subject to any disclaimer, the term of this patent is extended or adjusted under 35 U.S.C. 154(b) by 14 days.

(21) Appl. No.: 09/955,823

(22) Filed: Sep. 19, 2001

(51) Int. Cl.⁷ .................................................. A23P 1/14
(52) U.S. Cl. .......................... 426/93; 426/99; 426/234; 426/242; 426/302; 426/309; 426/445; 426/507
(58) Field of Search .................... 426/93, 242, 302, 426/309, 446, 559, 621, 808, 450

(56) References Cited

U.S. PATENT DOCUMENTS

| | | | |
|---|---|---|---|
| 2,480,679 A | 8/1949 | Spencer | 99/100 |
| 2,518,247 A | 8/1950 | Nairn | 99/81 |
| 2,958,602 A | 11/1960 | Gilmore | 99/80 |
| 3,498,796 A | 3/1970 | Bailey | 99/80 |
| 3,579,353 A | 5/1971 | Nakel et al. | 99/81 |
| 3,687,692 A | 8/1972 | Pitter et al. | 99/140 R |
| 3,689,291 A | 9/1972 | Draper | 99/177 |
| 3,695,894 A | 10/1972 | Hum | 99/134 R |
| 3,704,133 A | 11/1972 | Kracauer | 99/83 |
| 3,830,941 A | 8/1974 | Luft et al. | 426/177 |
| 3,843,804 A | 10/1974 | Evers et al. | 426/65 |
| 3,843,814 A | 10/1974 | Grunewald-Kirstein | 426/307 |
| 3,851,574 A | 12/1974 | Katz et al. | 426/107 |
| 3,882,255 A | 5/1975 | Gorham, Jr. et al. | 426/235 |
| 3,942,537 A | 3/1976 | Evers et al. | 131/17 R |
| 3,959,498 A | 5/1976 | Lyall et al. | 426/93 |
| 3,961,091 A | 6/1976 | Caccavale et al. | 426/307 |
| 3,973,045 A | 8/1976 | Brandberg et al. | 426/110 |
| 4,038,425 A | 7/1977 | Brandberg et al. | 426/107 |
| 4,096,281 A | 6/1978 | Young et al. | 426/89 |
| 4,219,573 A | 8/1980 | Borek | 426/107 |
| 4,251,551 A | 2/1981 | VanHulle et al. | 426/94 |
| 4,292,332 A | 9/1981 | McHam | 426/111 |
| 4,350,715 A | 9/1982 | Rek | 426/570 |
| 4,409,250 A | 10/1983 | Van Hulle et al. | 426/242 |
| 4,569,847 A | 2/1986 | Andrews | 426/94 |
| 4,571,337 A | 2/1986 | Cage et al. | 426/107 |
| 4,596,713 A | 6/1986 | Burdette | 426/107 |
| 4,627,985 A | 12/1986 | Yada et al. | 426/92 |

(List continued on next page.)

FOREIGN PATENT DOCUMENTS

| | | | | |
|---|---|---|---|---|
| EP | 0 242 828 A2 | 4/1987 | | A23L/1/18 |
| EP | 0 256 791 A2 | 8/1987 | | B65D/81/34 |
| EP | 0 262 791 A2 | 8/1987 | | A23L/1/18 |
| EP | 0 285 196 B1 | 3/1988 | | A21D/13/00 |
| EP | 0 294 087 A2 | 5/1988 | | B65D/81/34 |
| EP | 0 304 131 A1 | 8/1988 | | A23D/3/200 |
| EP | 0 338 239 A1 | 3/1989 | | A23L/1/18 |
| EP | 1 038 448 A1 | 9/2000 | | A23L/1/18 |
| WO | WO 94/00996 | 1/1994 | | |
| WO | WO 94/13160 | 6/1994 | | A23P/13/08 |
| WO | WO 97/42834 | 5/1997 | | |
| WO | WO 00/05396 | 7/1999 | | C12P/7/64 |
| WO | WO 00/30471 | 11/1999 | | A23L/1/00 |
| WO | WO 00/70965 A1 | 11/2000 | | A23L/1/182 |
| WO | WO 01/25414 A1 | 4/2001 | | C12N/11/10 |
| WO | WO 01/62106 A1 | 8/2001 | | A23L/1/18 |

*Primary Examiner*—Carolyn Paden
(74) *Attorney, Agent, or Firm*—Westman, Champlin & Kelly, P.A.

(57) ABSTRACT

A composition that includes a puffable food component and an edible emulsion, where the edible emulsion is a water-in-oil emulsion or an oil-in-water-in-oil emulsion, and the edible emulsion includes a sweetening agent, the edible emulsion transformable into a coating on a puffed form of the puffable food component upon application of energy to the composition that is sufficient to puff the puffable food component.

70 Claims, 3 Drawing Sheets

U.S. PATENT DOCUMENTS

| | | | |
|---|---|---|---|
| 4,640,842 A | 2/1987 | May | 426/534 |
| 4,661,671 A | 4/1987 | Maroszek | 219/10.55 E |
| 4,751,090 A | 6/1988 | Belleson et al. | 426/93 |
| 4,767,635 A | 8/1988 | Merritt et al. | 426/272 |
| 4,795,649 A | 1/1989 | Kearns et al. | 426/243 |
| 4,806,371 A | 2/1989 | Mendenhall | 426/113 |
| 4,849,233 A | 7/1989 | Hemker | 426/93 |
| 4,865,854 A | 9/1989 | Larson | 426/107 |
| 4,888,186 A | 12/1989 | Cooley et al. | 426/99 |
| 4,927,645 A | 5/1990 | Lee | 426/93 |
| 4,935,251 A | 6/1990 | Verhoef et al. | 426/94 |
| 4,960,598 A | 10/1990 | Swiontek | 426/107 |
| 4,963,708 A | 10/1990 | Kearns et al. | 219/10.55 E |
| 4,994,295 A | 2/1991 | Holm et al. | 426/549 |
| 5,020,688 A | 6/1991 | Power | 221/150 A |
| 5,064,669 A | 11/1991 | Tan et al. | 426/307 |
| 5,064,677 A | 11/1991 | Cain et al. | 426/611 |
| 5,075,119 A | 12/1991 | Mendenhall | 426/113 |
| 5,077,077 A | 12/1991 | Suzuki et al. | 426/602 |
| 5,080,914 A | 1/1992 | Birch et al. | 426/93 |
| 5,102,679 A | 4/1992 | Whalen | 426/349 |
| 5,108,772 A | 4/1992 | Wilbur | 426/559 |
| 5,151,290 A | 9/1992 | Norton et al. | 426/576 |
| 5,171,950 A | 12/1992 | Brauner et al. | 219/10.55 E |
| 5,188,859 A | 2/1993 | Lodge et al. | 426/560 |
| 5,215,770 A | 6/1993 | Aramouni | 426/93 |
| 5,284,666 A | 2/1994 | Graf | 426/242 |
| 5,298,268 A | 3/1994 | Maegli | 426/93 |
| 5,306,512 A | 4/1994 | Blamer | 426/107 |
| 5,356,645 A | 10/1994 | Del Villar | 426/107 |
| 5,362,504 A | 11/1994 | Kamper et al. | 426/89 |
| 5,443,858 A | 8/1995 | Jensen et al. | 426/618 |
| 5,458,898 A | 10/1995 | Kamper et al. | 426/243 |
| 5,466,479 A | 11/1995 | Frye | 426/611 |
| 5,585,127 A | 12/1996 | Freeport et al. | 426/93 |
| 5,607,708 A | 3/1997 | Fraser et al. | 426/96 |
| 5,688,543 A | 11/1997 | Freeport et al. | 426/93 |
| 5,690,853 A | 11/1997 | Jackson et al. | 219/727 |
| 5,690,979 A | 11/1997 | Bourns et al. | 426/307 |
| 5,747,080 A | 5/1998 | Lemke et al. | 426/72 |
| 5,750,166 A | 5/1998 | Schellhaass | 426/93 |
| 5,753,287 A | 5/1998 | Chedid et al. | 426/93 |
| 5,773,801 A | 6/1998 | Blamer et al. | 219/727 |
| 5,780,824 A | 7/1998 | Matos | 219/727 |
| 5,798,132 A | 8/1998 | Chen et al. | 426/305 |
| 5,878,910 A | 3/1999 | Gibernau et al. | 221/150 A |
| 5,897,894 A | 4/1999 | Glass | 426/89 |
| 5,919,505 A | 7/1999 | Monsalve et al. | 426/107 |
| 5,993,869 A | 11/1999 | Freeport | 426/107 |
| 5,994,685 A | 11/1999 | Jackson et al. | 219/727 |
| 5,997,916 A | 12/1999 | Dickerson et al. | 426/74 |
| 6,013,291 A | 1/2000 | Glass et al. | 426/74 |
| 6,068,876 A | 5/2000 | Miller et al. | 426/604 |
| 6,083,552 A | 7/2000 | Kershman et al. | 426/559 |
| 6,093,429 A | 7/2000 | Monsalve et al. | 426/107 |
| 6,100,513 A | 8/2000 | Jackson et al. | 219/727 |
| 6,103,292 A | 8/2000 | Del Vecchio | 426/601 |
| 6,200,611 B1 | 3/2001 | Ganesan et al. | 426/93 |
| 6,204,491 B1 | 3/2001 | Montani | 219/679 |
| 6,210,721 B1 | 4/2001 | Dickerson et al. | 426/74 |
| 6,291,008 B1 | 9/2001 | Robie et al. | 426/620 |
| 6,303,163 B1 | 10/2001 | Wu | 426/89 |

CARAMEL CORN PRODUCT AND A METHOD OF MAKING THE CARAMEL CORN PRODUCT

CROSS-REFERENCE TO RELATED APPLICATION(S)

NONE

BACKGROUND OF THE INVENTION

The present invention generally relates to a puffed food product and to a method of making the puffed food product. More specifically, the present invention concerns a coated puffed food product, such as popcorn, that is coated with a caramel-flavored substance or with a toffee-flavored substance, and to a method of making the coated puffed food product.

Puffed food products, such as popcorn, are a popular food for people of all ages. Puffed food products may be eaten as snacks and may be incorporated in various meal courses, such as entrees, side dishes, and desserts, for example. Various techniques are available for puffing a food product, such as heating the food product in hot oil or fat, heating the food product in a bath or current of hot air (popcorn that is prepared from corn kernels in a hot air popper, for example), and heating the food product using microwave energy.

Coatings have been developed to provide an extra level of flavor to the puffed food product beyond the flavor present in the puffed food product itself. Such flavoring techniques often take the form of a coating that is formed or placed on the puffed food product. Some techniques entail providing a coating composition in combination with the non-puffed form of the puffable food, where the puffing causes the coating composition to form a flavor coating on the puffed form of the food product. Other techniques entail applying a coating composition to the puffed form of the food product after the food product has been puffed.

Though consumers may purchase ready-made puffed food products that already include a flavor coating, many consumers want to prepare the puffed food product with the flavor coating in their own kitchens. However, with time at a premium for many families, these consumers who want to prepare coated puffed food products themselves want forms of these food products that are amenable to microwave preparation. To further simplify home preparation, these consumers likewise want a simple and easy single step approach to forming the puffed food product that includes the flavor coating of their choice.

Additionally, consumer tastes favor coated forms of puffed food products that exhibit both uniform flavor and uniform texture. Otherwise, the overall culinary experience of eating the coated puffed food product ebbs and falls as differences in the coating and differences in the coating composition are encountered. A coated food product that exhibits minimal or negligible coating thickness, and consequently minimal or negligible taste sensation, at one portion of the puffed food product, while exhibiting an excessive coating thickness, and consequently an excessive or overwhelming taste sensation at another portion of the same puffed food product, will quickly send many consumers in search for an alternative to that particular coated food product. Likewise, where achieving a coating with a particular texture on a coated food product is desired, the coated food product that exhibits a minimal or negligible amount of the particular texture, such as crunch, at one portion of the puffed food product, while exhibiting an excessive or overwhelming amount of the texture at another portion of the same puffed food product, will quickly send many consumers in search for an alternative to that particular coated food product.

While major advances have been made in the art of preparing coated puffed food products, a need yet remains for an approach that enhances the uniformity of the coating on the food product, while also enhancing the flavor uniformity and texture uniformity between different portions of the coated puffed food product. Likewise, while major advances have been made that simplify home preparation of puffable food products with applied flavor coatings, additional opportunities remain for simplified home preparation of puffed food products that include a flavor coating. The present invention addresses these consumer desires of enhancing coating uniformity, flavor uniformity, and/or texture uniformity on coated puffed food products, while also providing a simplified solution to preparation of coated puffed food products.

BRIEF SUMMARY OF THE INVENTION

The present invention includes a composition, where the composition includes a puffable food component and an edible emulsion, The edible emulsion is a water-in-oil emulsion or an oil-in-water-in-oil emulsion, and the edible emulsion includes a sweetening agent. The edible emulsion is transformable into a coating on a puffed form of the puffable food component upon application of energy to the composition that is sufficient to puff the puffable food component. The present invention further includes a puffable food composition and a method of making a coated puffed food product.

DETAILED DESCRIPTION

Figure 1:
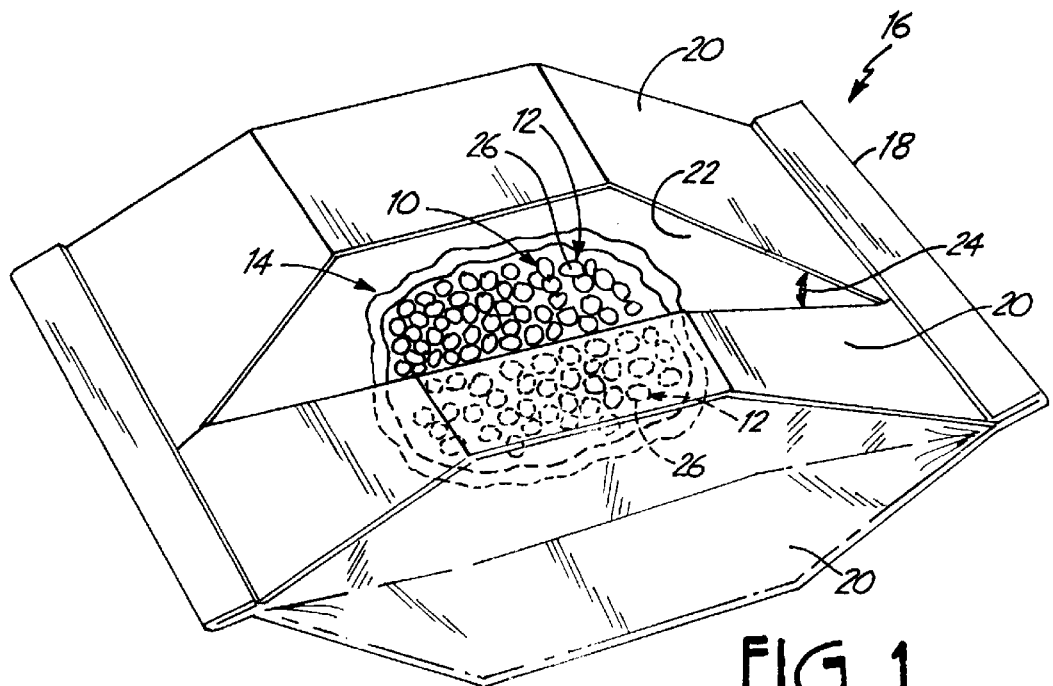
FIG. 1 is a perspective view of a microwavable popcorn package prior to closure of the package.

The present invention generally relates to a puffed food product and to a method of making the puffed food product. More specifically, the present invention concerns a coated puffed food product, such as popcorn, that is coated with a caramel-flavored substance or with a toffee-flavored substance, and to a method of making the coated puffed food product.

Throughout the drawings, like elements are referred to using like reference characters.

The coated puffed food product that may be prepared in accordance with the present invention may be based upon a coating blend, as generally depicted at 10 in FIG. 1, and a puffable food, such as puffable food pellets 12, that collectively form a food intermediate 14. The coating blend 10 may be deposited in a container 16, such as a microwavable package 18. The microwavable package 18 may have one or more wall portions 20 that collectively define an enclosed space 22 within the package 18 along with an opening 24 that leads into the enclosed space 22.

The coating blend 10 and the puffable food pellets 12, such as raw corn kernels 26, may be deposited, via the opening 24, within the enclosed space 22 of the package 18. Thereafter, the container 16, such as the package 18, may be prepared for storage of the food intermediate 14 and/or for puffing of the puffable food pellets 12. Where the container 16 is the microwavable package 18, preparation of the container 16 for storage of the food intermediate 14 may entail joining and securing the wall portions 20 proximate the opening 24, such as by adhesively sealing the wall portions 20 proximate the opening 24, to form a sealed microwavable package, as best depicted at 28 in FIG. 2.

In the sealed microwavable package 28, as compared to the microwavable package 18, the enclosed space 22 is virtually eliminated by bringing the wall portions 20 together so that the food intermediate 14 occupies most of the enclosed space 22 that is present in the sealed microwavable package 28. Furthermore, the wall portions 20 are preferably folded over one another to further help minimize the overall volume of the enclosed space 22 of the package 28 and minimize the amount of storage space required for storing the package 28 that contains the food intermediate 14.

Figure 3:
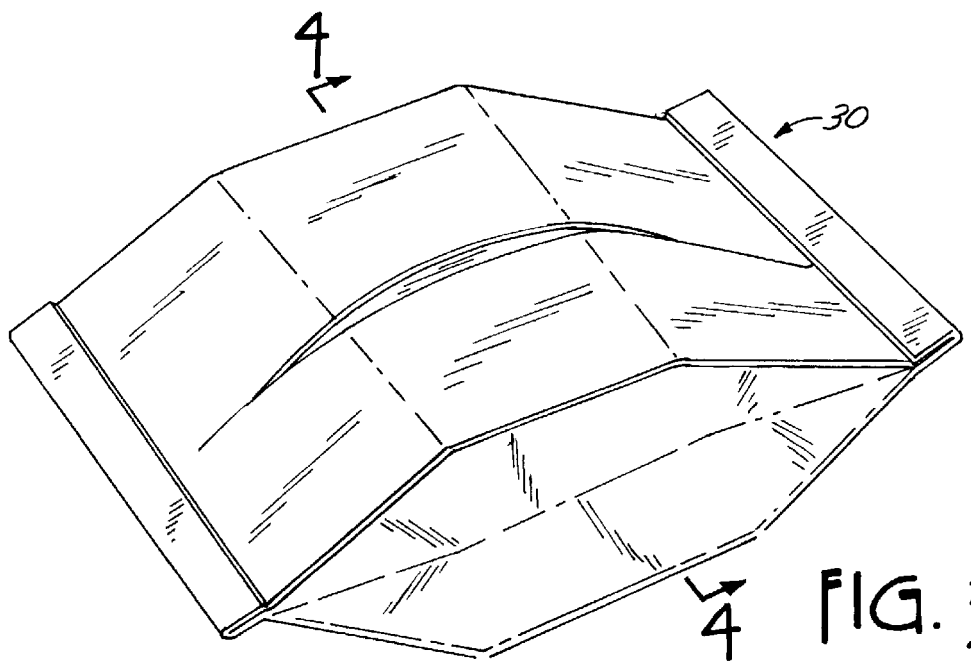
FIG. 3 is a perspective view of the microwavable popcorn package depicted in FIG. 3, but depicting the package after the package has expanded during popping of corn held within the bag.

When desired, the sealed microwavable package 28 (not shown in FIG. 3) may be placed in a microwave oven (not shown) and the food intermediate 14 (not shown in FIG. 3) may be exposed to microwave energy. Upon sufficient microwave energy application to the food intermediate 14, the sealed microwavable package 28 is transformed into a microwaved package, as best depicted at 30 in FIG. 3.

Figure 4:
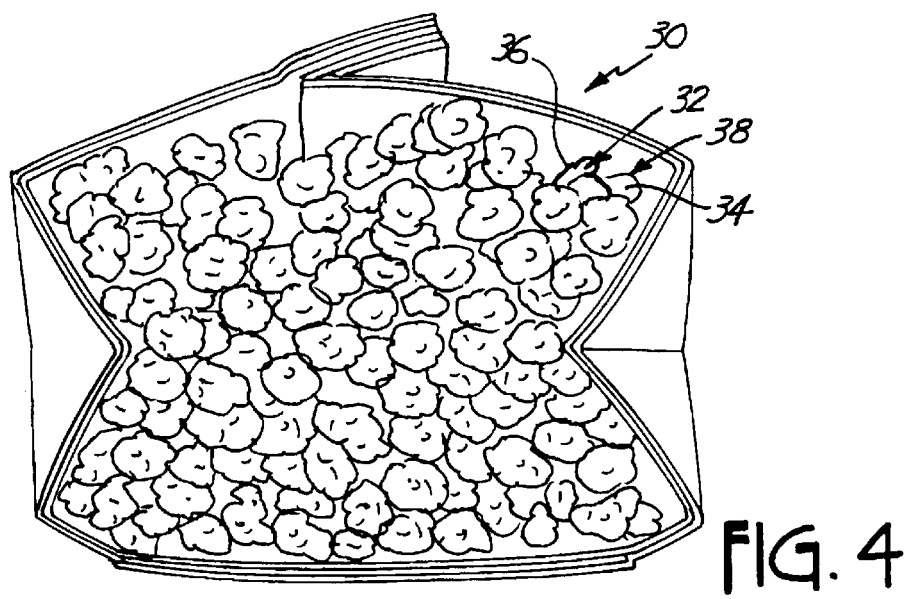
FIG. 4 is a sectional view along line 4—4 of the microwavable popcorn package depicted in FIG. 3.

Exposure of the food intermediate 14 to microwave energy (1) puffs the puffable food pellets 12, such as the raw corn kernels 26, and forms puffed food pellets, as best depicted at 32 in FIG. 4, such as popped corn kernels 34 (popcorn) and (2) transforms the coating blend 10 (not shown in FIG. 4) into a coating 36 that forms on the puffed food pellets 32. Collectively, the puffed food pellets 32 and the coating 36 on the puffed food pellets 32 are referred to as a coated puffed food product 38. The applied microwave energy heats moisture present in the puffable food pellets 12 and expands some of the heated moisture into water vapor. The water vapor formation expands the puffable food pellets 12 and thereby causes the puffable food pellets 12 to expand in volume and form the puffed food pellets 32.

Some examples of the puffable food pellets 12, such as the raw corn kernels 26, include a skin (not shown) that is relatively inelastic and relatively water impermeable. Therefore, as the moisture present in the raw corn kernels 26 is transformed into water vapor as a result of the moisture being heated, the water vapor formation builds up pressure within the kernels 26. When the pressure within the kernels 26 increases to a sufficient degree, the increased pressure causes the relatively inelastic skin of the kernels 26 to violently break and cause the "popping" noise that is characteristically heard when forming popcorn. Additionally, when the skin of the kernels 26 breaks, much of the moisture originally present in the kernels 26 escapes from the popped corn kernels 34, primarily in the form of water vapor.

On the other hand, some forms of the puffable food pellets 12 do not include a water impermeable skin. Therefore, in these other forms of the puffable food pellets 12, the formation of water vapor from moisture originally present in the puffable food pellets 12 may merely cause portions of the puffable food pellets 12 to expand while allowing some or all of the water vapor to escape. Consequently, puffing of these forms of the puffable food pellets 12 that do not include the water impermeable skin typically occurs without the violent skin breakage and substantial popping noise that are characteristic of popping raw corn kernels 26.

The effect of (1) puffable food pellet 12 positioning relative to the coating blend 10 on (2) the extent of coverage of the coating 36 on the puffed food pellets 32 depends on a number off actors. One important factor is the rate at which puffing occurs. As noted above, forms of the puffable food pellets 12, such as the raw corn kernels 26, that include the water impermeable skin tend to puff violently, and thus have a high rate of puffing; the actual time during which most or all of the expansion from the pellets 12 to the pellets 32 occurs is short - on the order of a second or less. On the other hand, forms of the puffable food pellets 12 that do not include the water impermeable skin tend to puff less violently, as compared to raw corn kernels 26, and thus have a lower rate of puffing; the actual time during which most or all of the expansion from the pellets 12 to the pellets 32 occurs is relatively long—greater than about a second, to ten seconds, to sixty seconds, or even to a number of minutes.

Another factor that may change the effect of (1) puffable food pellet 12 positioning relative to the coating blend 10 on (2) the extent of coverage of the coating 36 on the puffed food pellets 32 is the expansion ratio (volume of pellets 12 to volume of pellets 32). For some puffable food pellets 12, such as the raw corn kernels 26, the expansion ratio is relatively large—often greater than 200%. On the other hand, for some puffable food pellets 12, such as puffable dough or puffable pastries, the expansion ratio is relatively small—often less that 100%.

It is believed that the rate at which the pellets 12 puff has a significantly stronger effect than the expansion ratio on the relationship between (1) puffable food pellet 12 positioning relative to the coating blend 10 and (2) the extent of coverage of the coating 36 on the puffed food pellets 32. Specifically, where the puffable food pellets 12, such as the raw corn kernels 26, pop violently and have a rapid rate of puffing on the order of about a second or less, the puffable food pellets 12 may be positioned within the enclosed space 22 of the package 18 entirely separate from and free of contact with (even several inches away from) the coating blend 10, while still achieving a high degree of coverage of the coating 36 on the puffed food pellets 32 on the order of about 95% or more, and preferably on the order of about 100%.

It is believed that the violent puffing propels the puffed food pellets 32 about the enclosed space 22 and thereby helps to distribute the coating blend 10 onto the puffed food pellets 32. Of course, it is entirely acceptable to position the puffable food pellets 12, such as the raw corn kernels 26, that pop violently and have a rapid rate of puffing on the order of about a second or less near the coating blend 10 in the enclosed space 22 of the package 18 or even in intimate contact with the coating blend 10, while still achieving the high degree of coverage of the coating 36 on the puffed food pellets 32 on the order of about 95% or more, and preferably on the order of about 100%.

On the other hand, where the puffable food pellets 12 pop less violently and have a slower rate of puffing greater than about a second, the puffable food pellets 12 are preferably not positioned entirely separate from and free of contact with the coating blend 10 in the package 18, since such separate positioning may hinder coverage by, or even eliminate any significant coverage of, the coating blend 10 on the puffed food pellets 32. Instead, where the puffable food pellets 12 puff less violently and have a slower rate of puffing greater than about a second, the puffable food pellets 12 should be placed in intimate contact with the coating blend 10 to help enhance the degree of coverage of the coating 36 on the puffed food pellets 32. "Intimate contact," as used herein, may, for example, entail placing the puffable food pellets 12 in a pool (not shown) of the coating blend 10 or may entail drenching the puffable food pellets 12 with the coating blend 10 so that most, and preferably all, external surfaces of all puffable food pellets 12 are covered with the coating blend 10.

Ultimately, no matter the puffing characteristics and the puffing rate of the puffable food pellets 12, the puffable food pellets 12 should be placed in a relation (i.e. in a "coating relation") with the coating blend 10 that is effective to cause the coating 36 to be formed on the puffed food pellets 32 upon puffing of the puffable food pellets 12. The exact positioning of the puffable food pellets 12 relative to the coating blend 10 that is needed to constitute the "coating relation" will vary for different types of puffable food pellets 12, based upon variables such as the puffing characteristics and the puffing rate of the particular type of puffable food pellets under consideration. For example, raw popcorn kernels 26 that pop violently and therefore bounce excitedly about the container 18 upon popping, need not be initially placed in contact with the coating blend 10. Instead, excited movement of the popping kernels bring the popping kernels into contact with the coating blend 10, even though the raw popcorn kernels 26 are not initially placed in contact with the coating blend 10.

Additionally, where the puffable food pellets 12 pop less violently and have a slower rate of puffing greater than about a second, enhancing the degree of coverage of the coating blend 10 on the puffable food pellets 12 helps to enhance the degree of coverage of the coating blend 10 on the puffed food pellets 32. Therefore, where the puffable food pellets 12 pop less violently and have a slower rate of puffing greater than about a second, the degree of coverage of the coating blend 10 on the puffable food pellets 12 is preferably at least about 75%, more preferably at least about 90%, and still more preferably about 100%.

As the puffable food pellets 12 begin expanding, in response to the applied microwave energy, the sealed microwavable package 28 begins to expand and is transformed into the microwaved package 30. The microwaved package 30 includes the enclosed space 22 that accommodates the coated puffed food product 38. Though not bound by theory, it is believed that a combination of the pressure exerted by the moisture vapor escaping as the coated puffed food product 38 forms along with pressure exerted by the expanded volume of the puffed food pellets 32, as compared to the smaller volume of the puffable food pellets 12, spreads the wall portions 20 apart and recreates the enclosed space 22 within the microwaved package 30.

After the puffable food pellets 12 and the coating blend 10 have been predominantly or fully transformed into the coated puffed food product 38, the opening 24 (not shown in FIG. 4) is recreated in the package 30 and the coated puffed food product 38 is removed from the package 30 via the opening 24. Surprisingly, even when the coating blend 10 incorporates significant amounts of sugar, the coated puffed food product 38 slides easily from the package 30, typically without any need for hand removal of any of the product 38 from the package 30. This surprising result is believed due to the water-in-oil (or oil-in-water-in-oil) emulsion form of the coating 36 that forms on the puffed food pellets 32.

Figure 5:
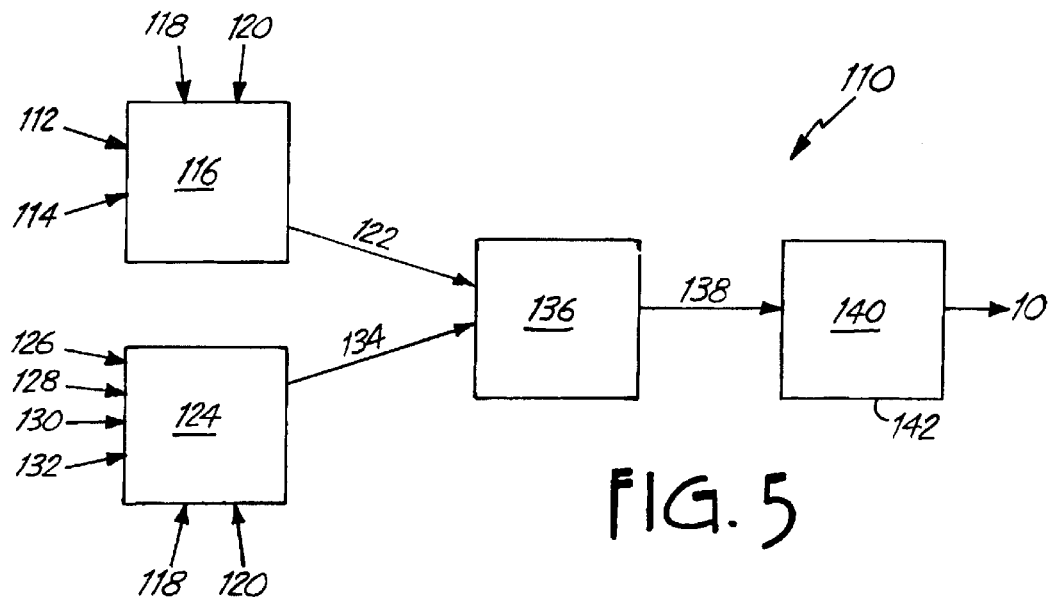
FIG. 5 is a schematic of a process for forming puffed or popped forms of a food product that incorporates a coating in accordance with the present invention.

The coating blend 10 of the present invention may be prepared using a process 110, as best depicted in FIG. 5, that is briefly described below. In the process 110, edible fat(s) 112 and edible emulsifying agent(s) 114 may be melted and blended together in a tank 116. In addition to the fat(s) 112 and the emulsifying agent(s) 114, edible flavor component(s) 118 and/or edible color component(s) 120 that are oil-soluble may also be added to the tank 116. The combination of the fat(s) 112, emulsifying agent(s) 114, and any selected flavor component(s) 118 and/or color component(s) 120 forms a fat blend 122.

The process 110 additionally includes a tank 124. Liquid sugar(s) 126 and/or syrup(s) 128 are placed in the tank 124. Alternatively, in place of some or all of the liquid sugar(s) 126, solid sugar(s) 130, along with any added water 132 needed to fully solubilize the solid sugar(s) 130 and form a substance equivalent in consistency and water content to the liquid sugar(s) 126, may be added in place of some or all of the liquid sugar(s) 126. The liquid sugar(s) 126, and/or solid sugar(s) 130 and any needed water 132, and/or syrup(s) 128 present in the tank 124 collectively constitute a sweetening agent 134. Additionally, besides the liquid sugar(s) 126, and/or solid sugar(s) 130 and any needed water 132, and/or the syrup(s) 128, flavor component(s) 118 and/or color component(s) 120 may also be added to the tank 124 and incorporated in the sweetening agent 134.

After the fat blend 122 and the sweetening agent 134 have been prepared, the fat blend 122 may be transferred to a mix tank 136. The sweetening agent 134 is slowly added to the fat blend 122 under conditions of high shear mixing to form the desired water-in-oil (or oil-in-water-in-oil) emulsion form of a coating intermediate 138 in the tank 136. The coating blend intermediate 138 may then be transferred to a traditional margarine and butter type of crystallization equipment 140, such as a chill roller or a swept surface heat exchanger 142, to form the coating blend 10. The coating blend 10 maintains the water-in-oil (or oil-in-water-in-oil) emulsion form originally present in the coating blend intermediate 138.

More particular details about the process 110 are provided below. First, the tank 116 that accepts the fat(s) 112 and the emulsifying agent(s) 114 is preferably jacketed to support both (1) heating of the fat(s) 112 and the emulsifying agents 114 in the tank 116 and (2) later cooling of the contents of the tank 116. Alternatively, the fat(s) 112 and the emulsifying agent(s) 114 may be heated prior to entering the tank 116, such as in a first tube-in-shell type heat exchanger (not shown), to fully melt the fat(s) 112 and the emulsifying agent(s) 114. Likewise, the later cooling of the contents of the tank 116 may alternatively be accomplished by pumping the contents through the first tube-in-shell type heat exchanger or a second tube-in-shell type heat exchanger (not shown).

No matter how the heating is accomplished, the fat(s) 112 and the emulsifying agent(s) 114 are preferably heated sufficiently to (1) completely melt both the fat(s) 112 and the emulsifying agent(s) 114 (2) remove any memory of crystallization originally present in the fat(s) 12 and the emulsifying agent(s) 114, and (3) support full and homogenous dispersal of the emulsifying agent(s) 114 within the fat(s) 112 in the tank 116. In pursuit of this goal, the fat(s) 112 and the emulsifying agent(s) 114 preferably are each heated to a temperature of at least about 155° F., or more. In addition to the fat(s) 112 and the emulsifying agent(s) 114, any oil-soluble flavor component(s) 118 and any oil-soluble color component(s) 120 that are added to the tank 116, are preferably added to the tank 116 after the fat(s) 112 and the emulsifying agent(s) 114 are fully melted to allow homogenous dispersal of any added flavor component(s) 118 and/or color component(s) 120 within the mixture of fat(s) 112 and emulsifying agent(s) 114.

Collectively, the fat(s) 112, the emulsifying agent(s) 114, and any oil-soluble flavor component(s) 118 and/or any oil-soluble color component(s) 120 form the fat blend 122. Preferably, all fat crystalline structures and fat crystal nuclei of the fat(s) 112, the emulsifying agent(s) 114), the optional flavor component(s) 118, and the optional color component(s) 120 are heated sufficiently to liquify all fat crystalline structures and all fat crystal nuclei and cause the fat crystalline structures and fat crystal nuclei to lose any crystalline memory. This loss of all crystalline memory by all fat crystalline structures and fat crystal nuclei of the fat(s) 112, the emulsifying agent(s) 114), the optional flavor component(s) 118, and the optional color component(s) 120 helps minimize, and preferably eliminate, any premature fat crystal formation in the fat blend 122 before fat crystal formation is desired.

To support homogenous mixing of the fat(s) 112, the emulsifying agent(s) 114, and any added flavor component(s) 118 and/or any added color component(s) 120, the tank 116 preferably includes a center post agitator (not shown) with agitation enhancement baffles (not shown) that are attached within the tank 116. Nonetheless, any conventional agitation mechanism may be employed in the tank 116, so long as mixing that is adequate to ensure homogenous dispersal of all substances that are added in the tank 116 is accomplished. The tank 116 preferably has a slanted, cone-shaped bottom (not shown) to permit complete emptying of the tank 116. One suitable example of the tank 116 is the WPDA (600 gallon/2271 liter capacity) process tank that is available from Waukesha Cherry-Burrell of Delavan, Wis.

After the fat(s) 112, emulsifying agent(s) 114, and any oil-soluble flavor component(s) 118 and/or any oil-soluble color component(s) 120 have been combined to form the fat blend 122, the fat blend 122 is cooled to a pre-sweetener addition temperature, with mild agitation, that is preferably effective to initiate formation of fat crystal nuclei and fat crystalline structures in the fat blend 122. The fat blend 122 is preferably cooled to a temperature in the range of about 85° F. to about 95° F., which is believed to favor formation of alpha fat crystal nuclei and alpha fat crystalline structures in the fat blend 122. Cooling of the fat blend 122 is preferably accomplished under agitation conditions that favor formation of alpha fat crystal nuclei and alpha fat crystalline structures in the fat blend 122, at a cooling rate that favors formation of alpha fat crystal nuclei and alpha fat crystalline structures in the fat blend 122, and to a final fat blend 122 temperature that favors formation of alpha fat crystal nuclei and alpha fat crystalline structures in the fat blend 122.

Formation of alpha fat crystal nuclei and alpha fat crystalline structures in the fat blend 122 is preferred since the presence of alpha fat crystal nuclei and alpha fat crystalline structures is thought to help boost the viscosity of the fat blend 122. A relatively high viscosity is preferred in the fat blend 122, as of the time when the sweetening agent 134 is blended with the fat blend 122, since the fat blend 122 with the relatively high viscosity favors the preferred formation of the coating blend intermediate 138 with an enhanced ratio of (1) the volume of the dispersed aqueous phase to (2) the surface area of the dispersed aqueous phase in the water-in-oil (or oil-in-water-in-oil) emulsion form of the coating blend intermediate 138, as explained more fully below. Essentially, the preferred relatively high viscosity of the fat blend 122 is thought to support entrapment of small droplets of the dispersed aqueous phase in the continuous fat phase within the coating blend intermediate, while helping to minimize, or even eliminate, coalescence of different individual small droplets of the dispersed aqueous phase with each other in the coating blend intermediate 138.

As to the sweetening agent 134, the tank 124 that accepts the liquid sugar(s) 126, and/or solid sugar(s) 130 and any needed water 132, and/or syrup(s) 128 is preferably jacketed to support heating of the liquid sugar(s) 126, and/or solid sugar(s) 130 and any needed water 132, and/or syrup(s) 128 in the tank 124. Alternatively, the liquid sugar(s) 126, and/or water 132, and/or syrup(s) 128 may be heated prior to entering the tank 124, such as in a tube-in-shell type heat exchanger (not shown). The tank 124 may be similar in design to the tank 116, with heat jacketing and a similar agitation mechanism, and preferably also includes a cone-shaped bottom like the tank 116.

The components of the sweetening agent 134 may include the liquid sugar(s) 126, and/or the combination of solid sugar(s) 130 and any needed water 132, and/or syrup(s) 128. The liquid sugar(s) 126, and/or the combination of solid sugar(s) 130 and any needed water 132, and/or syrup(s) 128 are homogeneously blended together in the tank 124. Though less preferred, either a combination of the sugar(s) 130 and water 132, or only the liquid sugar(s) 126, or only the syrup(s) 128 may be placed in the tank 124. In one preferred form of the present invention, only liquid sugar(s) 126 and syrup(s) 128 are added to, and homogeneously blended within, the tank 124, with the combination of sugar(s) 130 and water 132 being excluded from the sweetening agent 134.

Besides the liquid sugar(s) 126, and/or sugar(s) 128 and any needed water 132, and/or syrup(s) 128, flavor component(s) 118 and/or color component(s) 120 may also be added to the tank 124 and incorporated in the sweetening agent 134. Any flavor component(s) 118 and/or color component(s) 120 that are water-soluble may be directly added to the tank 124, either before or after addition of the liquid sugar(s) 126, and/or sugar(s) 128 and any needed water 132, and/or syrup(s) 128 to the tank 124. On the other hand, any oil-soluble flavor component(s) 118 w and/or oil-soluble color component(s) 120 that are to be added to the tank 124 are preferably first encapsulated in water to allow homogeneous dispersal of any such oil-soluble flavor component(s) 118 and/or oil-soluble color component(s) 120 within the sweetening agent 134.

When any oil-soluble flavor component(s) 118 and/or oil-soluble color component(s) 120 are incorporated in the sweetening agent 134, the sweetening agent 134 may consequently take the form of an oil-in-water emulsion. Therefore, though the coating blend 10, the coating 36, and the coating intermediate 138 are generally referred to herein as taking the form of a water-in-oil emulsion, it is to be understood that the coating blend 10, the coating 36, and the coating intermediate 138 instead take the form of an oil-in-water-in-oil emulsion when oil-soluble flavor component(s) 118 and/or oil-soluble color component(s) 120 are incorporated in the sweetening agent 134 and the sweetening agent 134 has the noted oil-in-water emulsion form.

After the fat blend 122 and the sweetening agent 134 have been prepared in the tanks 116, 124, respectively, the fat blend 122 is transferred to the mix tank 136. The physical characteristics of the mix tank 136 may generally be similar to those described above with respect to the tank 116 and the tank 124. The tank 136 is preferably jacketed to allow maintenance of a desired temperature within the mix tank 136. Typically, cooling water will be passed through the jacketing of the mix tank 136 during addition of the sweetening agent 134 to the fat blend 122. Additionally, the mix tank 136 should include agitation equipment sufficient to sweep internal surfaces (not shown) of the tank 136 prior to, during, and after addition of the sweetening agent 134 to the fat blend 122. This internal surface sweeping agitation equipment should minimize, and preferably eliminate, any adhesion or accumulation of the fat blend 122, or any adhesion or accumulation of components of the fat blend 122, on the internal surfaces of the mix tank 136.

The agitation equipment of the tank 136, in combination with the temperature of the fat blend 122 and the temperature of the sweetening agent 134 during addition of the sweetening agent 134 to the fat blend 122 and in combination with the rate of addition of the sweetening agent 134 to the fat blend 122, is preferably adequate to maximize dispersion of the sweetening agent 134 in the fat blend 122 and ensure creation of the coating blend intermediate 138 in the desired water-in-oil (or oil-in-water-in-oil) emulsion form. Additionally, this agitation equipment of the tank 136, in combination with the temperature of the fat blend 122 and the temperature of the sweetening agent 134 during addition of the sweetening agent 134 to the fat blend 122 and in combination with the rate of addition of the sweetening agent 134 to the fat blend 122, is preferably adequate to ensure a minimized droplet size of the dispersed aqueous phase within the continuous fat phase of the water-in-oil (or oil-in-water-in-oil) emulsion form of the coating blend intermediate 138 that is formed in the tank 136.

Also, the agitation equipment of the tank 136, in combination with the temperature of the fat blend 122 and the temperature of the sweetening agent 134 during addition of the sweetening agent 134 to the fat blend 122 and in combination with the rate of addition of the sweetening agent 134 to the fat blend 122, is preferably adequate to maximize the ratio of (1) the volume of the dispersed aqueous phase to (2) the surface area of the dispersed aqueous phase in the water-in-oil (or oil-in-water-in-oil) emulsion form of the coating blend intermediate 138 that is formed in the tank 136. Preferably, in pursuit of maximizing this ratio, droplets of the sweetening agent 134, as incorporated in the coating blend intermediate 138, have a maximum diameter in the range of about 30 micrometers to about 50 micrometers with a median diameter in the range of about 10 micrometers to about 20 micrometers. More preferably, in pursuit of maximizing this ratio, droplets of the sweetening agent 134, as incorporated in the coating blend intermediate 138, have a maximum diameter of about 30 micrometers with a median diameter in the range of about 5 micrometers to about 10 micrometers.

Maximizing the ratio of (1) the volume of the dispersed aqueous phase to (2) the surface area of the dispersed aqueous phase of the water-in-oil (or oil-in-water-in-oil) emulsion form of the coating blend intermediate 138 is believed to enhance the surface tension effect of the continuous fat phase on the droplets of the dispersed aqueous phase relative to the buoyance of the droplets of the dispersed aqueous phase in the continuous fat phase. Consequently, maximizing this volume to surface area ratio is believed to minimize movement of dispersed droplets of the dispersed aqueous phase within the continuous fat phase, with the consequent effect of enhancing the stability of the water-in-oil (or oil-in-water-in-oil) emulsion form of the coating blend intermediate 138 and the water-in-oil (or oil-in-water-in-oil) emulsion form of the subsequent coating blend 10.

As indicated above, the sweetening agent 134 may itself be an oil-in-water emulsion when oil-soluble flavor component(s) 118 and/or oil-soluble color component(s) 120 are incorporated in the sweetening agent 134. Therefore, when the sweetening agent 134 is an oil-in-water emulsion, unless otherwise indicated, a reference herein to the "dispersed aqueous phase" is instead a reference to a "dispersed oil-in-water phase" and a reference to any "dispersed aqueous phase" that is present. Essentially, when the sweetening agent 134 is in the form of an oil-in-water emulsion, the dispersed oil-in-water phase is present in the coating blend intermediate 138 and the dispersed aqueous phase (droplets of the sweetening agent 134 that do not contain any of the oil-soluble flavor component(s) 118 and/or oil-soluble color component(s) 120) may sometimes also be present in the coating blend intermediate 138.

The agitation equipment of the tank 136, as a nonexhaustive example, may take the form of a pair of agitators (not shown). One of the agitators may be a center post low frequency (such as about 20 to about 45 revolutions per minute) agitator with blades that are in contact with, and periodically sweep, interior surfaces of the tank 136 that are in contact with the fat blend 122, the coating blend intermediate 138, or mixtures of the fat blend 122 and the sweetening agent 134 prior to completion of the coating blend intermediate 138. Another of the two agitators may be a high frequency (such as about 1300 to about 1700 revolutions per minute), high shear mixer positioned between the center post of the center post low frequency agitator and the peripheral wall of the tank 136. In this configuration, the center post, low frequency agitator sweeps inner surfaces of the tank 136 and minimizes, and preferably eliminates, any adhesion or accumulation of the fat blend 122, or any adhesion or accumulation of components of the fat blend 122, on internal surfaces of the mix tank 136, while the high frequency, high shear mixer is predominantly, if not fully, dispersing the sweetening agent 134 in the fat blend 122.

After the fat blend 122 is added to the tank 136, the sweetening agent 134 is slowly transferred into the tank 136, under conditions of high shear mixing, to form the desired water-in-oil (or oil-in-water-in-oil) emulsion form of the coating blend intermediate 138. As an example, this may be accomplished by maintaining the fat blend 122, and mixtures of the fat blend 122 and the sweetening agent 134, at about the pre-sweetener addition temperature, such as within a temperature range of about 85° F. to about 95° F., as the sweetening agent 134 is slowly added to the fat blend 122 within the tank 136. This temperature maintenance of the fat blend 122 and of mixtures of the fat blend 122 and the sweetening agent 134 may be accomplished with cooling water that is passed through the jacketing of the tank 136. The cooling effects of the cooling water thus balance the heating effects of the added sweetening agent 134 with the elevated temperature.

The sweetening agent 134, at an elevated temperature relative to the pre-sweetener addition temperature of the fat blend 122, is added at a slow rate to the fat blend 122 within the tank 136 while operating the agitation equipment of the tank 136, such as the center post low frequency agitator and the high frequency, high shear mixer. Generally, it has been found adequate to have the temperature of the sweetening agent 134 in the range of about 130° F. to about 140° F.

while adding the sweetening agent 134 to the fat blend 122 at a rate of about 0.15 to about 0.4 weight percent of the sweetening agent 134 per second, where the weight percent of the sweetening agent 134 is based upon the total weight of the sweetening agent 134.

After the fat blend 122 and the sweetening agent 134 have been adequately mixed in the tank 136 to create the desired water-in-oil (or oil-in-water-in-oil) emulsion form of the coating blend intermediate 138, the intermediate 138 may then be transferred to a traditional margarine and butter type of crystallization equipment 140, such as a chill roller or a swept surface heat exchanger 142, to form the coating blend 10. The coating blend 10, like the coating blend intermediate 138, is in the form of a water-in-oil (or oil-in-water-in-oil) emulsion. The coating blend intermediate 138 that is fed to the crystallization equipment 140 may generally have a temperature approximately the same as the pre-sweetener addition temperature of the fat blend 122, such as, for example, a temperature within the range of about 85° F. to about 95° F.

The coating blend intermediate 138 is preferably pumped from the tank 136 to the crystallization equipment 140 under turbulent flow conditions that are effective to predominantly delay, and more preferably delay, further crystallization, or nucleation, of crystallizable fat components present in the coating blend intermediate 138 between the tank 136 and the crystallization equipment 140. For example, transfer of the coating blend intermediate 138 from the tank 136 to the crystallization equipment 140 at a linear rate ranging from about 75 feet per by minute to about 90 feet per minute (such as pumping about 0.8 to about 0.9 gallons per minute) through a 0.5" inner diameter line is typically effective to at least predominantly delay further crystallization and further nucleation of crystallizable fat components present in the coating blend intermediate 138.

The crystallization equipment 140, such as the swept surface heat exchanger 142, provides heavy mechanical treatment and rapid cooling to the coating blend intermediate 138 that quickly supercools the coating blend intermediate 138 to a temperature below about 75° F., preferably below about 65° F., and more preferably below about 55° F. The coating blend intermediate 138 is subjected to conditions in the crystallization equipment 140 that support crystallization, or nucleation, of crystallizable fat components in the coating blend intermediate 138 and consequent formation of the coating blend 10. Providing support for crystallization, or nucleation, of crystallizable fat components of the coating blend intermediate 138 in the crystallization equipment 140 is believed to entail nascent formation and/or development of fat crystal nuclei that are sufficient to support further fat crystal growth and fat crystalline structure development once the flow rate of the coating blend 10 is substantially reduced or flow of the coating blend 10 is ceased completely.

One suitable example of the swept surface heat exchanger 142 is the VOTATOR™ 672 DE swept surface heat exchanger that is available from Waukesha Cherry Burrell of Delavan, Wis. Though the swept surface heat exchanger 142 is depicted in the process 110, any equipment, such as a chilled roller type of exchanger, that is capable of (a) supercooling the water-in-oil (or oil-in-water-in-oil) emulsion (coating blend intermediate 138), (b) supporting nascent formation and/or development of fat crystal nuclei in this water-in-oil (or oil-in-water-in-oil) emulsion, and (c) forming the coating blend 10 may be substituted in place of the swept surface heat exchanger 142.

As another example, the swept surface heat exchanger 142 may be a VOTATOR™ pilot plant swept surface heat exchanger that is available from Waukesha Cherry Burrell of Delavan, Wis. This VOTATOR™ pilot plant swept surface heat exchanger has a barrel diameter of about two inches and a barrel length of about twelve inches. With the VOTATOR™ pilot plant swept surface heat exchanger operated at about 500 to about 550 revolutions per minute, the coating blend intermediate 138 enters the exchanger 142 at a temperature within the range of about 85° F. to about 95° F., exits the exchanger 142 at a temperature within the range of about 65° F. to about 75° F., and has a flow rate through the exchanger 142 of about eight to about ten pounds per minute. In this VOTATOR™ pilot plant swept surface heat exchanger example, the temperature change from the feed (coating blend intermediate 138) input to the product (coating blend 10) discharge may be about 10° F. to about 20° F. at the about eight to about ten pounds per minute flow rate of the coating blend intermediate 138 through the VOTATOR™ pilot plant swept surface heat exchanger.

The coating blend 10 may be directly combined with food products, such as the puffable food pellets 12, within the microwavable package 18. Alternatively, after exiting the crystallization equipment 140, the coating blend 10 may be placed into packages (not shown) to form a packaged coating blend (not shown). After the flow rate of the coating blend 10 drops into the laminar flow region, transformation of the coating blend 10 into a fat crystalline product accelerates. When the coating blend 10 stops flowing, or essentially stops flowing, the coating blend 10 is quickly transformed into the fat crystalline product. This transformation entails growth of fat crystal nuclei of the coating blend 10 into a fat crystalline matrix and a consequent viscosity increase as the coating blend 10 is transformed into the fat crystalline product.

Thus, for example, the coating blend 10 will typically begin the transformation into the fat crystalline product immediately after the coating blend 10 is combined with the food product, such as the puffable food pellets 12 within the microwavable package 18, and flow of the coating blend 10 has ceased or essentially ceased. As another example, the coating blend 10 will typically begin the transformation into the fat crystalline product immediately after the coating blend 10 has been packaged and flow of the coating blend 10 has ceased or essentially ceased.

The fat crystalline matrix of fat crystalline structures in the fat crystalline product form of the coating blend 10 develops rather quickly after flow of the coating blend 10 has ceased or essentially ceased. In fact, the fat crystalline matrix typically is substantially formed within just a few minutes, such as about five to about ten minutes, after flow of the coating blend 10 is stopped or essentially stopped. This ability for fat crystalline structures to rapidly form in the coating blend 10 indicates that particular properties and handling techniques are needed to facilitate combination of the coating blend 10 with food products, such as the puffable food pellets 12 within the microwavable package 18.

For example, the coating blend 10 preferably exhibits a viscosity, upon exiting the crystallization equipment 140, that is low enough at a temperature in the range of about 65° F. to about 75° F. to permit the coating blend 10 to be pumped under turbulent flow conditions through existing tubing and application equipment of food manufacturers without plugging the existing tubing and application equipment in food manufacturing plants. More preferably, the coating blend 10, upon exiting the crystallization equipment 140, exhibits a viscosity at a temperature in the range of about 65° F. to about 75° F. that is low enough to permit the coating blend 10 to be pumped and transported, as a fluid under turbulent flow conditions, (1) through at least about 50 feet, and more preferably about 75 feet, of small diameter tubing with an inner diameter of about 1 inch, or less, without plugging the tubing and (2) into the gravity fed hopper of a metering pump for application to food products, such as microwavable popcorn, in food manufacturing plants.

The coating blend 10, upon formation of the fat crystalline matrix of fat crystalline structures, preferably exhibits a sufficient degree of fat crystallization and a sufficient quality and number of fat crystalline structures to predominantly, and more preferably fully, immobilize droplets of the dispersed aqueous phase in the continuous fat phase of the water-in-oil emulsion form of the coating blend 10. Likewise, the coating blend 10, upon formation of the fat crystalline matrix of fat crystalline structures, preferably exhibits a sufficient degree of fat crystallization and a sufficient quality and number of fat crystalline structures to predominantly, and more preferably to fully, immobilize droplets of the dispersed oil-in-water emulsion phase and any droplets of the dispersed aqueous phase in the continuous fat phase of the oil-in-water-in-oil form of the coating blend 10.

This immobilization of dispersed aqueous phase droplets in the continuous fat phase of the water-in-oil emulsion form of the coating blend 10 and immobilization of dispersed oil-in-water emulsion phase droplets and any dispersed aqueous phase droplets in the continuous fat phase of the oil-in-water-in-oil emulsion form of the coating blend 10 helps prevent component seepage from the coating blend 10. The fat crystalline matrix of fat crystalline structures that forms in the coating blend 10 is believed to strongly contribute to preventing component seepage from the coating blend 10. Prevention of component seepage is important, especially after the coating blend 10 has been packaged along with the puffable food pellets 12, since any seepage of components, such as fat or aqueous components, from the coating blend 10 and through any packaging that contains the coating blend 10 may diminish the marketability of packaged food components that contain the coating blend 10. Prevention of component seepage from the coating blend 10 is also important, since component seepage would tend to alter the composition of the coating blend 10 and may allow contact between, and reaction of, potentially reactive components with other potentially reactive components and/or the puffable pellets 12.

Thus, the coating blend 10 of the present invention exhibits excellent stability characteristics following manufacture. Little, if any, wicking of components occurs, since components of the dispersed aqueous phase remain stabilized within the fat continuous phase of the coating blend 10 and fat components of the continuous fat phase of the coating blend 10 are fully entrapped, and thereby physically fixed, within the crystalline matrix of the fat crystalline product. After a few minutes of rest that allows the fat crystalline matrix of fat crystalline structures to form in the coating blend 10, no stains are typically observed visually after the coating blend 10 is placed on a sheet of paper, even after the coating blend 10 is allowed to rest on the paper for fairly long periods on the order of several hours, such as about 24 hours to about 48 hours. This observation holds true even at elevated temperatures, such as at the elevated temperatures sometimes seen in food storage warehouses. Indeed, after the coating blend 10 is placed into packages 18 containing raw popcorn kernels 26, little, if any, wicking of fat or water is typically observed visually after 48 hours at temperatures as high as about 120° F. Thus, no refrigeration is typically required to minimize or eliminate wicking of fluid components, such as fat or water, after preparing the coating blend 10 in accordance with the present invention. Wicking characteristics provided below may be evaluated in accordance with the Wicking Procedure that is described in the Property Determination and Characterization Techniques section of this document.

About 35 grams of the coating blend 10, after about ten minutes of rest that allows the fat crystalline matrix of at crystalline structures to form in the coating blend 10, generally leaks less than about 2 grams of fluid components during a 48 hour period when the coating lend 10 is held at a temperature up to about 72° F., more preferably when the coating blend 10 is held at a temperature ranging up to about 100° F., and still more preferably when the coating blend 10 is held at a temperature ranging up to about 12° F. Preferably, about 35 grams of the coating blend 10, after about ten minutes f rest that allows the fat crystalline matrix of fat crystalline structures to form in the coating blend 10, leaks less than about 1 gram of fluid components during a hour period when the coating blend 10 is held at a temperature ranging up to about 72° F., more preferably when the coating blend 10 is held at a temperature ranging up to about 100° F., and still more preferably when the coating blend 10 is held at a temperature ranging up to about 120° F.

More preferably, after about ten minutes of rest that allows the fat crystalline matrix of fat crystalline structures to form in the coating blend 10, less than about 0.5 grams of fluid components lea from about 35 grams of the coating blend 10 during a 48 hour period when the costing blend 10 is held at a temperature ranging up to about 72° F., more preferably when the coating blend 10 is held at a temperature ranging up to about 100° F., and still more preferably when the coating blend 10 is held at a temperature ranging up to about 120° F. Still more preferably, after about ten minutes of rest that allows the t crystalline matrix of fat crystalline structures to form in the coating blend 10, less than about 0.1 grams of fluid components leak from about 35 grams of the coating blend 10 during a 48 hour period when the coating blend 10 is held at a temperature ranging up to about 72° F., more preferably when the coating blend 10 is held at a temperature ranging up to about 100° F., and still more preferably when the coating blend 10 is held at a temperature ranging up to about 120° F. Most preferably, after about ten minutes of rest that allows the fat crystalline matrix of fat crystalline structures to form in the coating blend 10, no detectable amount of fluid components leaks from about 35 grams of the coating blend 10 during a 48 hour period when the coating blend 10 is held at a temperature ranging up to about 72° F., more preferably when the coating blend 10 is held at a temperature ranging up to about 100° F., and still more preferably when the coating blend 10 is held at a temperature ranging up to about 120° F.

The consistency of the coating blend 10, after a few minutes of rest that allows the fat crystalline matrix of fat crystalline structures to form in the coating blend 10, is another beneficial property of the coating blend 10. As noted, for puffable food pellets 12 that pop less violently and have a slower rate of puffing greater than about a second, the puffable food pellets 12 should be placed in intimate contact with the coating blend 10 to help enhance the degree of coverage of the coating 36 on the puffed food pellets 32. Formation of the coating blend 10 with a thicker consistency helps prevent the coating blend 10 from flowing away from the puffable food pellets 12 and consequently helps to maintain any desired intimate contact between the coating blend 10 and the puffable food pellets 12.

Furthermore, the consistency of the coating blend 10, after a few minutes of rest that allows the fat crystalline matrix of fat crystalline structures to form in the coating blend 10, is another measure of the stability of the coating blend 10. Where the consistency of the coating blend 10 remains steady, or at least essentially steady, this is a good indication that both (1) the dispersion of the aqueous phase within the fat continuous phase and (2) the fat crystalline matrix, is remaining steady, or at least essentially steady, in structural form. Preferably, after about ten minutes of rest that allows the fat crystalline matrix of fat crystalline structures to form in the coating blend 10, the coating blend 10, that is at room temperature (about 76° F.), exhibits a cone penetrometer reading that ranges from about 15 millimeters to about 25 millimeters, and more preferably from about 18 millimeters to about 22 millimeters, where the cone penetrometer reading is determined in accordance with the procedure set forth in the Property Determination and Characterization Techniques section of this document. Thus, after just a few minutes of rest that allows the fat crystalline matrix of fat crystalline structures to form, the coating blend 10, at room temperature (about 76° F.), preferably exhibits a consistency that is about intermediate between the consistency of stick margarine and the consistency of tub margarine.

As noted, the coating blend 10 may take the form of either the water-in-oil emulsion or the form of the oil-in-water-in-oil emulsion. The coating blend 10 includes edible fat(s), emulsifying agent(s), and water. In a preferred form, the coating blend 10 also includes the sweetening agent 134. The coating blend 10 may optionally include a variety of other miscellaneous components, such as the edible flavor component(s) 118, the edible color component(s) 120, and preservative(s), such as antioxidant(s). A variety of different components that may be included in the coating blend 10, such as any edible flavor component 118, any edible color component 120, and any component(s) of the sweetening agent 134, may potentially be reactive and therefore may be considered to be a potentially reactive component. Some non-exhaustive examples of potentially reactive components are at least some sugar component(s) of the sweetening agent 134 and common table salt (NaCl), one example of the optional flavor component 118.

Figure 6:
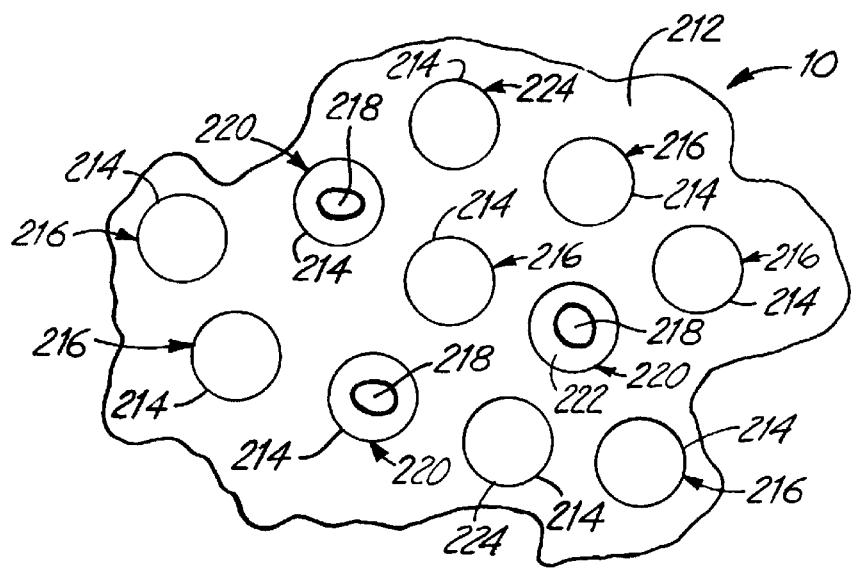
FIG. 6 is a graphic representation of the water-in-oil emulsion form of a coating blend of the present invention.

The coating blend 10 includes a fat continuous phase, as best depicted at 212 in FIG. 6, and a discontinuous, dispersed aqueous phase 214. Water-soluble forms of potentially reactive component(s) that are included in the coating blend 10 are present in droplets 216 of the dispersed aqueous phase 214 that are uniformly dispersed throughout the fat continuous phase 212. Oil-soluble forms of potentially reactive component(s) that are included in the coating blend 10 may be uniformly dispersed throughout the fat continuous phase 212 as part of the fat continuous phase 212. Alternatively, or in addition, oil-soluble forms of potentially reactive component(s) that are included in the coating blend 10 may be present as droplets 218 that are uniformly dispersed in droplets 220 of the dispersed aqueous phase 214, which yields the oil-in-water-in-oil emulsion form of the coating blend 10. These droplets 218 will typically include an aqueous encapsulating layer 222 that fully envelopes and secures oil-soluble forms of potentially reactive component(s) within the droplets 220. Any droplets 218 that are included in the coating blend 10 are preferably distributed uniformly within different droplets 220 of the dispersed aqueous phase 214.

Water-soluble forms of potentially reactive component(s) that are included in the coating blend 10 may permissibly be present in droplets 220 of the dispersed aqueous phase 214. Likewise, oil-soluble forms of potentially reactive component(s) that are included in the coating blend 10 may permissibly be present in droplets 216 of the dispersed aqueous phase 214. Preferably, the presence of water-soluble forms of potentially reactive component(s) is minimized in, and more preferably essentially or fully eliminated from, the droplets 220 to minimize the opportunity for interaction of different potentially reactive components. Likewise, the presence of oil-soluble forms of potentially reactive component(s) is preferably minimized in, and more preferably essentially or fully eliminated from, the droplets 216 to minimize the opportunity for interaction of different potentially reactive components.

Thus, droplets 216 of the dispersed aqueous phase 214 contain water-soluble forms of potentially reactive component(s), while droplets 220 of the dispersed aqueous phase 214 contain droplets 218 of oil-soluble forms of potentially reactive component(s). Besides the droplets 216, 220 of the dispersed aqueous phase 214, droplets 224 of the dispersed aqueous phase 214 may be dispersed in the fat continuous phase 212. The droplets 224, unlike the droplets 216, 220, do not contain any potentially reactive component(s). The droplets 224 may, however, contain oil-soluble or water-soluble components (such as oil-soluble or water-soluble forms of the optional flavor component(s) 118, the color component(s) 120, and sugar components of the sweetening agent 134) that do not constitute potentially reactive component(s). Also, the droplets 224 may possibly include only water.

Segregation of water-soluble form(s) of potentially reactive component(s) in droplets 216 of the dispersed aqueous phase 214 isolates these water-soluble form(s) of the potentially reactive component(s) that are present in the droplets 216 from any oil-soluble form(s) of potentially reactive component(s) that are dispersed in the fat continuous phase 212. Likewise, segregation of oil-soluble form(s) of potentially reactive component(s) by uniformly dispersing these oil-soluble form(s) of potentially reactive component(s) in the fat continuous phase 212 as part of the fat continuous phase 212 isolates these oil-soluble form(s) of potentially reactive component(s) from water-soluble form(s) of potentially reactive component(s) that are present in droplets 216 of the dispersed aqueous phase 214. Furthermore, segregation of oil-soluble form(s) of potentially reactive component(s) in the droplets 218 within the droplets 220 prevents these oil-soluble form(s) of potentially reactive component(s) of droplets 218 from interacting with potentially reactive component(s) (such as potentially reactive components in the droplets 216 or potentially reactive components that are in the fat continuous phase 212) that are located outside of the droplets 218. An additional benefit of the present invention is that the segregative structures described above for both water-soluble forms and oil-soluble forms of potentially reactive component(s) effectively isolate both water-soluble and oil-soluble forms of potentially reactive component(s) from interaction with the puffable food pellets 12 (not shown in FIG. 6), such as the raw corn kernels 26, prior to initiating puffing of the puffable food pellets 12.

Ultimately, this ability to isolate different potentially reactive components from each other within the coating blend 10 and from the puffable food pellets 12 allows the food intermediate 14 (not shown in FIG. 6), as well as, the coating blend 10 to exhibit extraordinary stability (i.e.: chemical and biochemical stability) with no, or essentially no, degradation of any components of the food intermediate 14 during longer storage periods on the order of about six (6)

months, or more, at relatively warm storage temperatures of about 70° F., or more. Thus, the food intermediate 14, as well as, the coating blend 10 exhibit extraordinary shelf stability characteristics, without refrigeration, that result in no, or essentially no, chemical or biochemical degradation, and thus no, or essentially no, flavor degradation, color degradation, or nutritional degradation during a first period, even when this first period is on the order of about one month, six months, one year or longer, at relatively warm storage temperatures of about 70° F., about 100° F., about 120° F., or more.

These shelf stability characteristics have been found to exist both (1) when the first period extends from preparation of the coating blend 10, through creation of the food intermediate 14, and to formation of the puffed food pellets 32 with the coating 36 and (2) when the first period merely extends from creation of the food intermediate 14 to formation of the puffed food pellets 32 with the coating 36. Essentially, the coating blend 10 is a shelf stable inert matrix of the various components present in the coating blend 10. Likewise, the food intermediate 14 is a composite of the coating blend 10 that incorporates this stable inert matrix of the various components present in the coating blend 10. Consequently, the food intermediate 14, as well as the coating blend 10, exhibit extraordinary shelf stability characteristics that impart no, or essentially no, chemical or biochemical degradation, and thus no, or essentially no, flavor degradation, color degradation, or nutritional degradation, to the coated puffed food product 38.

Flavor stability (or conversely flavor degradation) characteristics for the coating blend 10 and for the food intermediate 14 may be evaluated using the Flavor Stability procedure set froth in the Property Determination and Characterization Techniques section of this document. Likewise, color stability characteristics (or conversely color degradation characteristics) for the coating blend 10 (either separately or as incorporated in the food intermediate 14) may be evaluated using the Reflectance Spectra procedure set forth in the Property Determination and Characterization Techniques section of this document.

Additionally, the fat continuous phase 212 of the coating blend 10 acts as a heat transfer medium when the food intermediate 14 is being heated. The fat continuous phase 212 absorbs heat energy and transfers this heat energy to the puffable food pellets 12. At atmospheric pressure, the maximum temperature of liquid water is about 212° F. After the temperature of the liquid water reaches about 212° F. at atmospheric pressure, the liquid water is gasified into water vapor. Neither hot liquid water, even at temperatures of about 212° F., nor heated water vapor at atmospheric pressure and temperatures somewhat above about 212° F. are able to transfer heat to the raw corn kernels 26 at a rate that is effective to efficiently pop the raw corn kernels 26. Instead, the fat continuous phase 212, which remains liquid at temperatures well above about 212° F., is needed to transfer heat to the raw corn kernels 26, one important example of the puffable food pellets 12, at a rate that is effective to efficiently pop the raw corn kernels 26.

Thus, the fat continuous phase 212 is the portion of the coating blend 10 that supports puffing of the puffable food pellets 12, such as the raw corn kernels 26. While the fat continuous phase 212 is enabling puffing of the puffable food pellets 12, the fat continuous phase 212 may also transfer heat to the dispersed aqueous phase 214, or more specifically to the different droplets 216, 220, 224 of the dispersed aqueous phase 214. The coating blend 10 should typically include a sufficient amount of water, as present in liquid form in the dispersed aqueous phase 214 or more specifically in the different droplets 216, 220, 224 of the dispersed aqueous phase 214, to allow some (an "excess" amount) of the liquid water present in the droplets 216, 220, 224 to remain in the droplets 216, 220, 224 even after the puffable food pellets 12, such as the raw corn kernels 26, have been predominantly, and preferably fully, puffed.

Water-soluble forms of potentially reactive component(s) included in the coating blend 10 are distributed within the droplets 216 of the dispersed aqueous phase 214, while other water-soluble components of the coating blend 10 that are not potentially reactive are distributed within droplets 224 of the dispersed aqueous phase 214. Also, oil-soluble forms of potentially reactive component(s) included in the coating blend 10 are distributed within the droplets 220 of the dispersed aqueous phase 214, while other oil-soluble component(s) of the coating blend 10 that are not potentially reactive are distributed within droplets 224 of the dispersed aqueous phase 214. Most preferably, predominantly all, more preferably essentially all, and most preferably all of the sweetening agent 134, including any portion(s) of the sweetening agent 134 that are not potentially reactive, is collectively included in the droplets 216, 220, 224 of the dispersed aqueous phase 214.

The excess liquid water that is present in the droplets 216, 220, 224 assures that the sweetening agent 134 present in the droplets 216, 220, 224 remains relatively cool (at about 212° F., or less) while the puffable food pellets 12 are being puffed. Consequently, the excess liquid water in the droplets 216, 220, 224 helps prevent scorching, burning, and dry cooking of sweetening agent 134 present in the droplets 216, 220, 224 during puffing of the puffable food pellets 12. Thus, the coating blend 10 of the present invention is scorch-resistant and burn-resistant, and is resistant to dry-cooking, despite the substantial presence of the sweetening agent 134 in the coating blend 10.

Preferably, an adequate amount of excess liquid water is present in the dispersed aqueous phase 214, specifically in the droplets 216, 220, 224, to assure that the sweetening agent 134 present in the droplets 216, 220,224 does not scorch or burn during continued energy application that extends at least about fifteen (15) seconds after puffing of the puffable food pellets 12 has been completed. This fifteen second supply of excess moisture helps to keep the sweetening agent 134 solubilized in the relatively cool (about 212° F.) liquid water and thereby provides a buffer against burning, scorching, or dry cooking of the sweetening agent 134, in the event the person who is puffing the puffable food pellets 12 accidentally allows energy application to continue for a short period of time after puffing of the puffable food pellets 12 has ended. Typically, about five (5) percent excess water in the dispersed aqueous phase 214 has been found adequate to provide this fifteen second buffer against burning, scorching, or dry cooking of the sweetening agent 134.

Burning or scorching of the sweetening agent 134 is undesirable because the burned or scorched of the sweetening agent 134 would tend to contribute unappealing off-tastes to the coated puffed food product 38. Dry cooking of the sweetening agent 134 is likewise undesirable, since dry cooked forms of the sweetening agent 134 would tend to transform the sweetening agent 134 into a viscous, sticky glob, rather than allowing the sweetening agent 134 to be homogeneously incorporated in the coating 36.

The water-in-oil (or the oil-in-water-in-oil) emulsion form of the coating blend 10 thus serves at least a couple of different and important functions. First, the water-in-oil (or the oil-in-water-in-oil) emulsion form of the coating blend 10 supports isolation of different potentially reactive components from each other within the coating blend 10 and from the puffable food pellets 12. The water-in-oil (or the oil-in-water-in-oil) emulsion form the coating blend 10 thereby allows the food intermediate 14, as well as, the coating blend 10 to exhibit extraordinary stability (i.e.: chemical and biochemical stability) with no, or essentially no, degradation of any components of the food intermediate 14 during longer storage periods at relatively warm storage temperatures. Additionally, the water-in-oil (or the oil-in-water-in-oil) emulsion form of the coating blend 10 helps prevent scorching, burning, and dry cooking of the sweetening agent 134 during, and even after, puffing of the puffable food pellets 12. Essentially, the water-in-oil (or the oil-in-water-in-oil) emulsion form of the coating blend 10 allows the coating blend 10 to carry water, including the excess amount of water, in time-release fashion, that makes the coating blend 10 scorch-resistant, burn-resistant, and resistant to dry-cooking, despite the substantial presence of the sweetening agent 134 in the coating blend 10.

Though excess moisture is preferably provided, as described above, in the coating blend 10 to provided the buffer against burning, scorching, or dry cooking of the sweetening agent 134, the excess moisture in the coating blend 10 should not be unlimited. Specifically, soon after the puffed food pellets 32 have been formed, the sweetening agent 134 remaining in the coating of the residual form of the coating blend 10 on the puffed food pellets 32 should be capable of quickly reacting to form the coating 36 that remains on the puffed food pellets 32. This reaction of the sweetening agent 134 cannot successfully proceed until the temperature-modulating excess liquid moisture in the dispersed aqueous phase 214 has been exhausted by transforming the excess water into water vapor.

Until the excess water has been transformed into water vapor, the excess water vapor will tend to prevent the coating of the residual form of the coating blend 10 from reaching a sufficient temperature that will support reactions, such as crystallizing and caramelizing reactions, that include the sweetening agent 134. Thus, the water content of the water-in-oil (or the oil-in-water-in-oil) emulsion form of the coating blend 10 must be balanced against the ability of the water to prevent the sweetening agent 134 from scorching, burning, and/or dry-cooking versus the ability of the water to hinder final formation of the coating 36.

The puffable food pellets 12 may take a variety of different forms. For example, the puffable food pellets 12 may be any puffable raw grain, such as corn kernels, milo, rice, wheat, oats, sorghum, millet, and any of these in any combination. Any puffable raw grain that is used as part or all of the puffable food pellets 12 may be either hulled or dehulled. Likewise, the puffable food pellets 12 may be any puffable dough pellets or pieces, such as the puffable dough pellets that are disclosed in U.S. Pat. Nos. 4,409,250 and 5,108,772 that are each hereby incorporated by reference in their entirety. Additionally, the puffable food pellets 12 may be a mixture of any combination of any puffable dough pellets with any combination of any puffable raw grain.

As used herein, the tern "puffable", in relation to the food pellets 12, is broad enough to refer to pellets, such as raw corn kernels 26, with relatively water impermeable, inelastic skins that can bear some degree of increased internal water vapor pressure before violently breaking and cause a "popping" noise of the type that is characteristically heard when forming popcorn. Likewise, the term "puffable", in relation to the food pellets 12, is also broad enough to refer to pellets, such as dough pellets, that do not include a relatively water impermeable, inelastic skin such that formation of water vapor from moisture originally present in the pellets merely causes portions of the pellets 12 to expand while allowing some or all of the water vapor to escape, without the violent skin breakage and substantial popping noise that are characteristic of popping raw corn kernels 26.

Though the puffable food pellets 12 may be or include puffable dough pellets and/or any of the wide variety of puffable raw grains described herein, the puffable food pellets 12 of the present invention are primarily referred to herein in terms of raw corn kernels 26 of the type commonly used to form popcorn (i.e.: popped corn kernels 34). The raw corn kernels 26 may be either hulled or dehulled. Also, the kernels 26 may be either large, medium, or small in size and may be either white or colored, such as yellow or black. Furthermore, the raw corn kernels 26 may optionally be internally flavored and/or internally colored. In one particular form, the raw corn kernels 26 have a kernel count of about 40 to about 80 kernels per 10 grams of the kernels 26 and have an internal moisture level ranging from about 11 weight percent to about 14 weight percent, based upon the total weight of the raw corn kernels 26, to facilitate popping of the raw corn kernels 26.

The coating blend 10 includes water to facilitate formation of the desired water-in-oil (or oil-in-water-in-oil) emulsion form of the coating blend 10. The water will generally originate, at least to a substantial extent, in the liquid sugar(s) 126, the syrup(s) 128 and/or as the water 132 that may optionally be combined with the optional solid sugar(s) 130.

Besides water, the coating blend 10 includes the edible fat(s) 112. As used herein, the term "fat" refers to compositions that are primarily, or fully made of one or more fatty acids, and glycerides thereof, of all types, no matter whether the composition is a liquid (i.e. "oil") at room temperature or is a solid (i.e.: "fat") at room temperature, or is a semi-solid (mixture of oil and fat) at room temperature.

The edible fat(s) 112 may be or include either dairy fat(s), such as butterfat (also known as butter oil); non-dairy fat(s); or any combination of any dairy fat(s) and non-dairy fat(s). The non-dairy fat(s) may be any conventional, shelf stable, non-dairy fat(s), non-dairy oil(s), or any mixtures thereof from either plant (vegetable), animal, or marine sources, including, but not limited to, soybean oil, cottonseed oil, safflower oil, corn oil, peanut oil, canola oil, and any mixture of any of these. Any oils used as the non-dairy fat component(s) of the coating blend 10 may be partially hydrogenated to provide the oil in a semi-solid form, but are preferably fully hydrogenated, to assure that the oil takes the form of solid fat. Some suitable sources for partially hydrogenated soybean oil and for fully hydrogenated soybean oil include Honeymead Products Co. (also referred to as Harvest States Oilseed Processing & Refining) of Mankato, Minn. and Cargill, Incorporated of Minnetonka, Minn.

Some non-exhaustive examples of dairy fat(s) that may be part or all of the edible fat(s) 112 component of the coating blend 10 include conventional salted butter, as defined by the U.S.D.A. (United States Department of Agriculture), butter oil, and anhydrous butter. Conventional salted butter, according to the definition of the U.S.D.A. contains not less than 80 weight percent dairy fat and about 15 to about 16 weight percent water, based upon the total weight of the butter, with the balance of the butter being various non-fat dairy solids. Butter oil consists of the clarified fat portion of milk, cream, or butter that is obtained by removing non-fat constituents from butter. According to the U.S.D.A. definition, butter oil contains not less than 99.7 weight percent fat, not more than 0.2 weight percent water, and not more than 0.05 weight percent milk solids non-fat, based upon the total weight of the butter oil.

Another example of a suitable dairy fat component of the edible fat(s) 112 component of the coating blend 10 is a high butter fat, low moisture butter substance that includes at least about 95 weight percent butter fat and less than about 3 weight percent water, with the balance being dairy solids non-fat. Such high butter fat, low moisture butter materials may be prepared by removing moisture from conventional butter without destroying the physical structure of the butter. Furthermore, any dairy fat component(s) of the edible fat(s) 112 component of the coating blend 10 may be ultra-high fat butter that contains greater than about 98 weight percent butter fat and about 1 weight percent to about 1.5 weight percent water, based upon the total weight of the ultra-high fat butter, with the balance typically being dairy solids non-fat. Preferably, any ultra-high fat butter fat that is used in the coating blend 10 contains about 98.3 weight percent to about 98.6 weight percent butter fat, about 1.1 weight percent water to about 1.3 weight percent water, and about 0.085 weight percent to about 0.12 weight percent dairy solids non-fat, based upon the total weight of the ultra-high fat butter. Suitable high butter fat, low moisture butter and ultra-high fat butter are each commercially available from Land O'Lakes, Inc. of Arden Hills, Minn.

The coating blend 10 may additionally include the emulsifying agent(s) 114. The emulsifying agent(s) 114 may generally be any food grade emulsifying agent(s), such as a highly lipophilic surfactant, that is suitable for forming water-in-oil (or oil-in-water-in-oil) emulsions. The emulsifying agent(s) 114 may generally be any individual food grade emulsifying agent or any combination of different food grade emulsifying agent(s). Non-ionic emulsifiers that provide maximum stability in the presence of electrolytes (such as salt) and are stable in the presence of acidic or alkaline conditions that may occur in the case of certain flavorings (lemon or chocolate flavoring, for example) are preferred. In general, the available substances of this type include esters of polyhydric alcohols, such as glycerine, polyglycols, etc., with fatty acids, such as oleic acid, stearic acid, cottonseed oil, etc. Any emulsifying agent(s) 114 that is selected for use in the coating blend 10 preferably has a low HLB (hydrophillic-lipophilic balance), preferably in the range of about 2.5 to about 5, and is consequently characterized as primarily lipophilic.

Some non-exhaustive examples of suitable classes of food grade emulsifying agent(s) 114 include monoglycerides, such as ethoxylated monoglycerides of edible $C_{12}$–$C_{24}$ fatty acids, distilled monoglycerides of edible $C_{12}$–$C_{24}$ fatty acids, and acetylated monoglycerides of edible $C_{12}$–$C_{24}$ fatty acids; diglycerides, such as ethoxylated diglycerides of edible $C_{12}$–$C_{24}$ fatty acids and distilled diglycerides of edible $C_{12}$–$C_{24}$ fatty acids; propylene glycol; monoesters; lactylated esters; polyglycerol esters; sorbitan esters; ethoxylated esters; succinylated esters; fruit acid esters; phosphated esters; sucrose esters; and any combination of any of these. Monoglycerides and diglycerides are compounds in which one or two hydroxyl groups of glycerol, respectively, have reacted to form ethers or esters. Monoglycerides have one substituent per molecule in place of the hydroxyl group, while diglycerides may have two like substituents or two unlike substituents per molecule in place of two hydroxyl groups. Monoglycerides and diglycerides of edible $C_{12}$–$C_{24}$ fatty acids may be separate, individually supplied components, or may be supplied in various prepared combinations with each other. Distillation of the monoglyceride and diglyceride reaction products removes by-products, such as triglycerides, and unreacted glycerine.

One particular suitable example of the emulsifying agent 114 is the DIMODAN™ distilled monoglyceride-diglyceride blend (~90 weight percent monoglycerides) that is available from Gristed Ingredients, Inc. of New Century, Kans. Some other suitable examples of the emulsifying agent 114 include the MONICS® blend of distilled monoglycerides and distilled diglycerides that is available from Food Basics of Holland; ADG distilled monoglycerides that are available from Archer Daniels Midland Company of Decatur, Ill.; and de-oiled soybean lecithin, such as NUTRIPUR® P de-oiled, powdered, soybean lecithin that is available from Lucas Meyer Inc. of Decatur, Ill. Another example of a suitable emulsifying agent is the MAX-EMUL® 210 blend of refined fluid soy lecithin, propylene glycol, ethoxylated monoglycerides and ethoxylated diglycerides that is available from Central Soya Corp. of Fort Wayne, Ind.

The sweetening agent 134 that is incorporated in the coating blend 10 may generally be any substance that is non-volatile and induces a sweet taste sensation (as opposed to any of the other recognized primary taste sensations-sour, salty, and bitter). Any sweetening agent 134 component(s) that is incorporated in the coating blend 10 should not disrupt formation or maintenance of the water-in-oil (or the oil-in-water-in-oil) emulsion form of the coating blend 10. Some exemplary generic forms of the sweetening agent 134, or portions thereof, include nutritive carbohydrate sweetening substance(s), non-nutritive carbohydrate sweetening substance(s), protein-based sweetening substance(s), or any of these in any combination.

The nutritive carbohydrate sweetening substance(s) that are contemplated for incorporation in the coating blend 10 will normally comprise saccharides with a degree of polymerization of less than three (e.g. the mono-and di-saccharides) as the major molar dry solids component of the sweetener. Some non-exhaustive examples of suitable nutritive carbohydrate sweetening substances that may be included in the sweetening agent 134 include sucrose, invert sugar (a sugar obtained by acid hydrolysis of cane sugar; invert sugar contains approximately 50 weight percent glucose and 50 weight percent fructose), dextrose, lactose, maltose, fructose, honey, maple syrup, brown sugar, molasses, corn syrup, corn syrup solids, and any combination of any of these. Any brown sugar that is included in the sweetening agent 134 may be either based upon an unrefined or a partially refined form of beet or cane sugar or may be based upon a predominantly refined form of a beet or cane sugar that is combined with molasses. Some non-exhaustive exemplary sources of nutritive carbohydrate sweetening agents include sugar cane, sugar beets, and corn (for corn syrup).

As used herein, the term "corn syrup" refers to a partial hydrolysate of starch. The term "corn syrup" embraces not only syrups that are generally referred to in the food industry as glucose syrups, but also includes all other partial hydrolysates of starch, such as high maltose corn syrups and high fructose corn syrups. Corn syrup solids include the solids from corn syrup along with a small or de minimis amount of water from the corn syrup. Corn syrup solids are produced by substantially or essentially fully removing the moisture content from a corn syrup.

Corn syrups are often characterized in terms of a particular dextrose equivalent (also referred to as "DE"). The "dextrose equivalent" term is a measure of the reducing-sugar content of a particular corn syrup that is calculated based upon the anhydrous dextrose content of the corn syrup and is expressed as the weight percent of anhydrous dextrose in the corn syrup, based upon the total dry weight of the corn syrup. In the food industry, the "corn syrup" term is sometimes used to describe corn starch partial hydrolysates that have a dextrose equivalent in the range of about 28 weight percent to about 68 weight percent, based upon the total dry weight of the corn syrup partial hydrolysates. As used herein, the "corn syrup" term is not limited to this particular range of dextrose equivalents.

In addition to the nutritive carbohydrate sweetening substance(s), the sweetening agent 134 may permissibly include non-nutritive carbohydrate sweetening substance(s). Some non-exhaustive examples of non-nutritive carbohydrate sweetening substance(s) include saccharin, cyclamate, and any of these in any combination. Additionally, the sweetening agent 134 may permissibly include protein-based sweetening substance(s). Some non-exhaustive examples of protein-based sweetening substance(s) include aspartame, thaumatin, monellin, and any of these in any combination. Furthermore, any combination of any nutritive carbohydrate sweetening substance(s), any non-nutritive carbohydrate sweetening substance(s), and any protein-based sweetening substance(s) may be incorporated as the sweetening agent 134 in the coating blend 10. Nonetheless, the concentration of sweeteners with an excessive sweetness intensity, including, but not limited to, aspartame and sucralose, is preferably minimized to favor formation of the coating 36 with an adequate amount of crunchy texture for consumer tastes and disfavor formation of the coating 36 with a soggy texture.

The nutritive carbohydrate sweetening substance(s), non-nutritive carbohydrate sweetening substance(s), and protein-based sweetening substance(s) that may be included in the sweetening agent 134 may take a variety of different forms. For example, the nutritive carbohydrate sweetening substance(s), non-nutritive carbohydrate sweetening substance(s), and/or protein-based sweetening substance(s) may be in solid form, such as in powdered form or in granular form. Conventional table sugar, namely white granulated sucrose, is an example of the nutritive carbohydrate sweetening substance in the solid form. As another example, the nutritive carbohydrate sweetening substance(s), non-nutritive carbohydrate sweetening substance(s), and/or protein-based sweetening substance(s) may be in liquid form, where the liquid form will typically be a solution of the sweetening substance (i.e., a sweetening substance solution), such as an aqueous solution of the sweetening substance.

The syrup 128 is one non-exhaustive example of the sweetening substance solution, although not all sweetening substance solutions are necessarily syrups. The term "syrup", as used in the food industry, typically refers to a sweetening substance solution that is relatively viscous and contains a relatively high solids content on the order of about 80 weight percent solids, or more, based upon the total weight of the sweetening substance solution. Preferably, the syrup 128, consistent with the usage of the term "syrup" in the food industry, is a sweetening substance solution with a solids (more preferably as saccharides with a degree of polymerization of less than three) concentration of about 80 weight percent to about 95 weight percent, based on the total weight of the sweetening substance solution, where the solvent portion of the sweetening substance solution is preferably water. Some non-exhaustive examples of the syrup 128 include corn syrup, maple syrup, honey, molasses, and any of these in any combination.

On the other hand, the sweetening substance solution may be a solution of nutritive carbohydrate sweetening substance(s), a solution of non-nutritive carbohydrate sweetening substance(s), a solution of protein-based sweetening substance(s), or a solution of any combination of any of these in a solvent with a solids concentration of greater than 0 weight percent to less than about 80 weight percent, based upon the total weight of the sweetening substance solution. Preferably, the solids are present in the sweetening substance solution primarily, and more preferably predominantly, as saccharides with a degree of polymerization of less than three. Preferably, the solvent portion of the sweetening substance solution is primarily, and more preferably predominantly, water. The liquid sugar(s) 126 are an example of the sweetening substance solution with a solids concentration of greater than 0 weight percent to less than about 80 weight percent. Some exemplary forms of the liquid sugar(s) 126 include saccharides with a degree of polymerization of less than three, such as sucrose, glucose, fructose, dextrose, lactose, maltose, and any combination of these, as at least predominantly, and more preferably at least essentially all, of the solids content of the sweetening substance solution, where water is preferably the solvent of the liquid sugar(s) 126.

Besides the syrup 128, some other exemplary components of the sweetening agent 134 include the liquid sugar(s) 126, and/or a combination of the solid sugar(s) 130 and any needed water 132, where the sugar(s) 130 and any needed water 132 may be separately added to the tank 124. As some other non-exhaustive alternatives, either the combination of the solid sugar(s) 130 and any needed water 132, or only the liquid sugar(s) 126, or only the syrup(s) 128 may be included in the sweetening agent 134. In one preferred form of the present invention, only liquid sugar(s) 126 and syrup(s) 128 are included in the sweetening agent 134, with the combination of solid sugar(s) 130 and any needed water 132 being excluded from the sweetening agent 134. In another preferred form of the present invention, high maltose corn syrup is included as the syrup 128 in the sweetening agent 134, with liquid sugar(s) 126, solid sugar(s) 130, and the combination of solid sugar(s) 130 and any needed water 132 being excluded from the sweetening agent 134. Some suitable examples of high maltose corn syrup include any high maltose corn syrup(s) from the SATIN SWEET® line of high maltose corn syrups that are available from Cargill Sweeteners, Inc. of Minnetonka, Minn., such as the SATIN SWEET® 55% high maltose corn syrup, SATIN SWEET® 65% high maltose corn syrup, and SATIN SWEET® 75% high maltose corn syrup.

At least some of the sweetening agent 134 components that are described above are believed to be examples of potentially reactive components that should be isolated from other components of the coating blend 10 to maximize the stability of the coating blend 10. Any sweetening agent 134 component that is also one of the potentially reactive components is automatically isolated, via the procedure of the present invention, from other components of the coating blend 10 that would be affected by reaction of this potentially reactive component. This isolation essentially eliminates, and preferably eliminates, the potential for any degradation of flavor, color, or nutritional characteristics in the coating blend 10 by the potentially reactive components).

The coating blend 10 may also include one or more of the flavoring component(s) 118. The flavor component(s) 118 may include any artificial or natural flavor additive(s) that do not disrupt formation or maintenance of the water-in-oil (or the oil-in-water-in-oil) emulsion form of the coating blend 10. Some flavoring component(s) 118 tend to be reactive under particular conditions and are therefore examples of potentially reactive component(s) that are beneficially isolated via the technique of the present invention. For example, salt, which is an example of a flavoring agent that may be used as the flavoring component 118, is ionic and is therefore potentially reactive, absent isolation of the salt from other permissible components of the coating blend 10.

When salt is included as one of the flavor component(s) 118, one preferred incorporation technique incorporates very fine-grained salt, (i.e., siftable through a 325 mesh (U.S. Standard) sieve), where the very fine-grained salt may permissibly be added to the tank 116 or the tank 124, but is preferably added to the tank 124. When salt is included as one of the flavor component(s) 118, another preferred incorporation technique first solubilizes and compartmentalizes the salt in water, as a part of moisture and salt-containing vacuoles, with a size specific for the salt particles that are individually included in each vacuole, and where the salt-containing vacuoles are added to the tank 116, dispersed in the fat blend 122, and dispersed in the continuous fat phase of the coating blend 10.

Beside salt (NaCl), some other non-exhaustive examples of flavoring component(s) 118 include maple extract, vanilla extract, peanut butter, peanut flavoring, lemon extract, lemon peel, orange extract, orange peel, fruit flavors, chocolate syrup and chocolate powder, cheese, butterscotch flavoring, caramel flavoring, toffee flavoring, any other conventional food flavoring agent, and any of these in any combination, with the caveat that any flavoring component(s) 118 selected for incorporation in the coating blend 10 should not hinder formation or co maintenance of the water-in-oil (or the oil-in-water-in-oil) emulsion form of the coating blend 10. Some of the flavoring component(s) 118 that are listed above may tend to be reactive under particular conditions and are therefore examples of potentially reactive component(s). Any of the flavoring component(s) 118 that is also an example of the potentially reactive component(s) is beneficially isolated, via the procedure of the present invention, from other components of the coating blend 10 that would be affected by reaction of this potentially reactive compound. This isolation essentially eliminates, and preferably eliminates, the potential for any degradation of flavor, color, or nutritional characteristics in the coating blend 10 by the potentially reactive component(s).

Besides flavoring component(s) 118, the coating blend 10 may also include one or more of the color component(s) 120. Though the sweetening agent 134 could theoretically be browned during heating of the food intermediate 14, such browning is hard to control, especially in a mass manufacturing environment. Therefore, one function of the optional color component(s) 120 is to supply a simulated browned tint to the coated puffed food product 38 in place of actually browning the sweetening agent 134.

The color component(s) 120 may include any artificial or natural color additive(s) that do not disrupt formation or maintenance of the water-in-oil (or the oil-in-water-in-oil) emulsion form of the coating blend 10. Some color component(s) 118 tend to be reactive under particular conditions and are therefore examples of potentially reactive component(s) that are beneficially isolated via the technique of the present invention. Any of the color component(s) 120 that is also an example of the potentially reactive component(s) is beneficially isolated, via the procedure of the present invention, from other components of the coating blend 10 that would be affected by reaction of this potentially reactive compound. This isolation essentially eliminates, and preferably eliminates, the potential for any degradation of flavor, color, or nutritional characteristics in the coating blend 10 by the potentially reactive component(s). Some exemplary color component(s) 120 include FD & C (Food, Drug and Cosmetic) Red No. 3 (A.K.A. Food Red 14 and Erythrosine BS), FD & C Yellow No. 5 (A.K.A. Food Yellow 4 and Tartrazine), FD & C Yellow No. 6 (A.K.A. Food Yellow 3 and Sunset Yellow FCF), FD & C Green No. 3 (A.K.A. Food Green 3 and Fast Green FCF), FD & C Blue No. 2 (A.K.A. Food Blue 1 and Indigo Carmine), FD & C Blue No. 1 (A.K.A. Food Blue 2 and Brilliant Blue FCF), and FD & C Violet No. 1 (A.K.A. Food Violet 2 and Violet B6).

Besides flavoring component(s) 118, the coating blend 10 may also include one or more nutritional agents, such as vitamins and/or minerals. The nutritional agent(s) may include any artificial or natural nutritional agent(s) that do not disrupt formation or maintenance of the water-in-oil (or the oil-in-water-in-oil) emulsion form of the coating blend 10. Some agent(s) tend to be reactive under particular conditions and are therefore examples of potentially reactive component(s) that are beneficially isolated via the technique of the present invention. Any of the nutritional agent(s) that is also an example of the potentially reactive component(s) is beneficially isolated, via the procedure of the present invention, from other components of the coating blend 10 that would be affected by reaction of this potentially reactive compound. This isolation essentially eliminates, and preferably eliminates, the potential for any degradation of flavor, color, or nutritional characteristics in the coating blend 10 by the potentially reactive component(s). Some non-exhaustive exemplary nutritional agents are thiamine (Vitamin $B_1$), riboflavin, niacinamide, pyridoxine (Vitamin $B_6$), ascorbic acid (Vitamin C), Vitamin A, Vitamin D, Vitamin E, iron, calcium, phosphorus, zinc, and any of these in any combination.

In addition to fat(s), water, sweetening agent(s), flavoring agent(s), coloring agent(s), nutritional agent(s) and emulsifier(s), the coating blend 10 may also include any conventional, edible antioxidant(s) that do not interfere with formation or maintenance of the water-in-oil (or the oil-in-water-in-oil) emulsion form of the coating blend 10. These antioxidant(s) will typically be incorporated in the fat blend 122 of the coating blend 10 to enhance the shelf stability of fat component(s) that are incorporated in the fat blend 122. The antioxidant(s) may generally include any artificial or natural antioxidant(s) that do not disrupt formation or maintenance of the water-in-oil (or the oil-in-water-in-oil) emulsion form of the coating blend 10. Some antioxidant(s) tend to be reactive under particular conditions and are therefore examples of potentially reactive component(s) that are beneficially isolated via the technique of the present invention. Some exemplary antioxidant(s) that may be incorporated in the coating blend 10 include tocopherol(s), propyl gallate, butylated hydroxytoluene (also referred to as "BHT"), butylated hydroxyanisole (also referred to as "BHA"), and any of these in any combination.

Some general comments about component concentration ranges are provided below. In two preferred forms of the coating blend 10, the coating blend 10 is formulated to yield a caramel-flavored popcorn and a toffee-flavored popcorn. Those of ordinary skill in the art are capable of formulating the coating blend 10 to yield the coating 36 as a caramel-flavored coating and as a toffee-flavored coating. Typically, the coating blend 10 that yields a toffee-flavored form of the coating 36 will include a higher percent of butter, or butterfat, than a formulation of the coating blend 10 that yields a caramel-flavored form of the coating 36. Of course, beyond toffee-flavored forms of the coating 36 and caramel-flavored forms of the coating 36, innumerable other flavors are envisioned for the coating 36, such as butterscotch flavor, chocolate flavor, butter brickle flavor, peanut butter flavor, and butter pecan flavor, among others.

In the coating blend 10, the concentration of water may generally range from about 5 to about 40 weight percent, based upon the total weight of the coating blend 10. Preferably, the concentration of water in the coating blend 10 ranges from about 10 weight percent to about 30 weight percent, based upon the total weight of the coating blend 10, to maximize beneficial aspects exhibited by the coating blend 10. The water present in the coating 10 will generally originate, at least to a substantial extent, in the liquid sugar(s) 126, the syrup(s) 128, and/or as any needed water 132 that may be combined with the optional solid sugar(s) 130 in the tank 124.

The total concentration of the fat(s) 112 in the coating blend 10 may generally range from about 20 weight percent to about 50 weight percent, based upon the total weight of the coating blend 10. However, the dry weight ratio of the sweetening agent 134 to the total weight of all fat(s) 112 in the coating blend 10 is preferably high enough to support formation of the coating 36 with a crunchy texture. If such a crunchy texture is not formed, the fat-continuous nature of the coating 36 may sometimes tend to cause the coated puffed food product 38 to undesirably have a soggy, fat texture. In support of this goal, the concentration of the fat(s) 112 in the coating blend 10 preferably ranges from about 25 weight percent to about 45 weight percent, based upon the total weight of the coating blend 10, and more preferably ranges from about 30 weight percent to about 40 weight percent, based upon the total weight of the coating blend 10, to support formation of the coating 36 with the desired crunchy texture.

As noted above, butter may be included as part of the fat(s) 112. The overall concentration of butter in the coating blend 10 preferably does not exceed about 10 weight percent, based on the total weight of the coating blend 10, since butter is marginally somewhat more expensive than some other fat(s) 112. Also, when butter is used as part of the fat(s) 112, the calculation of the total weight percent fat in the coating blend 10 should take into account only the fat content of the butter, since butter does include a significant amount of water along with, when the butter is salted butter, a lesser amount of salt.

The sweetening agent(s) 134 of the coating blend 10 may include nutritive carbohydrate sweetening substance(s), non-nutritive carbohydrate sweetening substance(s), protein-based sweetening substance(s), or any of these in any combination. Generally, the dry weight concentration of the sweetening agent(s) 134 in the coating blend 10 may range from about 40 weight percent to about 70 weight percent, based upon the total weight of the coating blend 10. At sweetening agent 134 concentrations (dry weight) above about 70 weight percent, based on the total weight of the coating blend 10, it believed that less satisfactory forms of the coating 36 with an overly chewy and/or grainy texture may sometimes result. Concentrations of the sweetening agent(s) 134 that are provided here are based upon the dry weight of the sweetening agent(s) 134, as compared to the total weight of the coating blend 10, though the sweetening agent(s) 134 may be provided in liquid form as, for example, corn syrup, liquid sugar, or as syrup that includes some amount of water.

One preferred form of the sweetening agent(s) 134 includes only nutritive carbohydrate sweetening substance(s) in the form of syrup, preferably corn syrup, and either (1) the liquid sugar(s) 126 or (2) the combination of solid sugar(s) 130 and any needed water 132 or (3) the solid sugar(s) 130 (without any of the water 132) that are separately added to the tank 124. One especially preferred form of the sweetening agent(s) 134 includes only nutritive carbohydrate sweetening substance(s) in the form of (1) syrup, preferably corn syrup, and (2) liquid sugar(s) 126. Generally, when the sweetening agent(s) 134 includes only syrup and either (1) the liquid sugar(s) 126 or (2) the combination of solid sugar(s) 130 and any needed water 132 or (3) the solid sugar(s) 130, the ratio of the syrup to either the liquid sugar(s) 126 or the solid sugar(s) 130, on a dry weight basis, in the sweetening agent 134 may range from about 50:50 to about 90:10 and is preferably about 70:30.

Next, rather than using a small amount of an intensely sweet substance in, or as, the sweetening agent 134, the sweetening agent 134 preferably includes a larger concentration of sweet substances with a lower sweetness intensity to favor formation of the coating 36 with an adequate amount of the desired crunchy texture. Some examples of sweetening agents that have an excessive sweetness intensity include aspartame and sucralose, while some examples of sweetening agents with a more preferred sweetness intensity include sucrose and corn syrups.

The flavor component(s) 118 may generally be included in the coating blend 10 at any concentration that is effective to yield the desired intensity of flavor in the coated puffed food product 38, and consequently in the coating 36. In pursuit of this goal, it has been found that the concentration of individual flavor component(s) 118 in the coating blend 10 typically may range from 0 weight percent to about 3 weight percent, based upon the total weight of the coating blend 10, while the total concentration of all individual flavor component(s) 118 in the coating blend 10 may collectively range, typically, from 0 weight percent to about 6 weight percent, based upon the total weight of the coating blend 10. However, salt (NaCl), one example of the flavor component(s) 118, should have a maximum concentration in the coating blend 10 of about 2 weight percent, based upon the total weight of the coating blend 10. Higher concentrations of salt tend to hasten heating of water in the droplets 216, 220, 224 and therefore may, if not held to the maximum about 2 weight percent concentration, cause some undesired burning, scorching, or dry cooking of the sweetening agent 134.

Likewise, the color component(s) 120 may generally be included in the coating blend 10 at any concentration that is effective to yield the desired intensity of color in the coated puffed food product 38, and consequently in the coating 36. In pursuit of this goal, the concentration of the coloring component(s) 120 in the coating blend 10 may generally range from about 0 weight percent to about 1 weight percent, based upon the total weight of the coating blend 10, and will more typically range from about 0 weight percent to about 0.5 weight percent, based upon the total weight of the coating blend 10.

Additionally, the concentration of the emulsifying agent(s) 114 in the coating blend 10 may generally range from about 0.1 weight percent to about 0.4 weight percent, based upon the total weight of the coating blend 10.

Preferably, the concentration of the emulsifying agent(s) 114 in the coating blend 10 ranges from about 0.1 weight percent to about 0.2 weight percent, based upon the total weight of the coating blend 10. Finally, the total concentration of antioxidant(s) in the coating blend 10 may generally range from about 0 parts by weight to about 500 parts by weight, per million parts by weight of the fat(s) 112 of the coating blend 10. Preferably, the total concentration of antioxidant(s) in the coating blend 10 ranges from about 25 parts by weight to about 100 parts by weight per million parts by weight of the fat(s) 112 in the coating blend 10 to avoid the potential for a pro-oxidant effect.

Finally, the weight ratio of the coating blend 10 to the puffable food pellets 12 in the food intermediate 14 may generally range from about 1:1 to about 3:1. Preferably, however, the weight ratio of the coating blend 10 to the puffable food pellets 12 in the food intermediate 14 ranges from about 1:1.5 to about 3:1, especially when the puffable food pellets 12 are raw corn kernels 26, to assure that enough of the coating blend 10 is present to form the coating 36 in fully continuous form on the puffed food pellets 32, such as the popped corn kernels 34 (popcorn).

After the coating blend 10 has been prepared, the coating blend 10 and the puffable food pellets 12, such as the raw corn kernels 26, may be deposited in the container 16, such as in the enclosed space 22 of the microwavable package 18, as best depicted in FIG. 1. The puffable food pellets 12, as previously discussed, are placed in coating relation with the coating blend 10 within the package 18. The puffable food pellets 12 or the coating blend 10 may permissibly mn be placed in the package 18 first, or the puffable food pellets 12 and the coating blend 10 may be simultaneously placed in the package 18.

The package 18 may include any conventional microwave susceptor (not shown) of the type conventionally employed in microwavable food heating packages, such as many microwavable popcorn packages that are currently on the market. Microwave susceptors, which are typically metalized to some degree, tend to preferentially absorb microwave energy at a higher rate than other components of the microwavable food heating packages, and therefore tend to heat faster than other components of the microwavable food heating packages. This enables the microwave susceptor to rapidly transfer heat energy to the food intermediate 14 soon after microwave energy application to the package 18 is begun. On the other hand, the microwave susceptor may permissibly be excluded from the package 18, though the package 18 preferably does include the microwave susceptor. If the package 18 does include the microwave susceptor, the food intermediate 14 is preferably positioned on the microwave susceptor.

Figure 2:
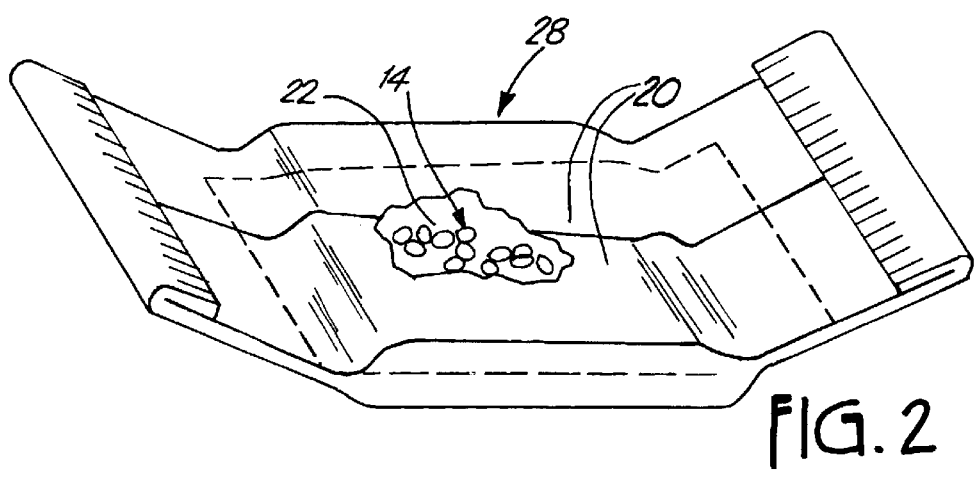
FIG. 2 is a perspective view of the microwavable popcorn package depicted in FIG. 1, after closure of the microwavable popcorn package.

The package 18 containing the food intermediate 14 may then be closed and sealed to form the sealed microwavable package 28, as best depicted in FIG. 2, in preparation for storage and subsequent microwave heating or may be immediately placed in the microwave oven (not shown). The microwave oven may be any conventional microwave oven. Microwave ovens that are currently available typically have a wattage rating ranging from about 500 watts to about 1500 watts, though the wattage of the microwave oven may permissibly vary outside of this range. Of course, the time required to puff the puffable food pellets 12, such as the time required to pop the raw corn kernels 26, and form the coating 36 from the coating blend 10 will vary depending upon at least a couple of variables such as (1) the quantity of food intermediate 14 that is placed in the microwave oven and (2) the wattage of the microwave oven. The microwave oven preferably includes a turntable (not shown), with the sealed microwavable package 28 being placed on the turntable, to enhance even application of microwave energy to different portions of the food intermediate 14.

Though the container 16 is primarily described in terms of the microwavable package 18 and the heating source for the food intermediate 14 is primarily described in terms of the microwave oven, it is to be understood that the container 16 is not limited to only microwavable packages and the heating source for the food intermediate 14 is not limited to only microwave ovens. Indeed, the container 16 may be a metal pot (not shown) and the heating source may be a source (not shown) of direct heat, such as a flame or electrical resistance heater of the type employed in conventional stove top heating elements. Alternatively, the heating source may be a convection oven (not shown), and the container 16 may be a package (not shown) of the type conventionally employed when using convection ovens. Nonetheless, the container 16 is preferably the microwavable package 18 and the heating source for the food intermediate 14 is preferably the microwave oven to take advantage of the fast and simple preparation of the coated puffed food product 38 that is attainable using microwave ovens.

After the sealed microwavable package 28 has been placed in the microwave oven, and microwave energy application is begun, the fat(s) 112 of the fat continuous phase 212 absorb applied microwave energy from the metallic susceptor within the package 28 and rapidly transfer much of this energy to the puffable food pellets 12, such as the raw corn kernels 26. The transferred energy causes the pellets 12 to begin puffing. Where the puffable food pellets 12 are the raw corn kernels 26, the transferred energy causes the kernels 26 to begin popping. The microwave energy application to the food intermediate 14, via the metallic susceptor, is continued until the puffing rate of the puffable food pellets 12 drops to a very slow rate. Where the puffable food pellets 12 are the raw corn kernels 26, the microwave energy application to the food intermediate 14 is continued until the in popping rate of the raw corn kernels 26 drops to a very slow rate, such as a rate of less than about two pops per second.

Meanwhile, while the puffable food pellets 12 are puffing or popping, heat energy from any microwave susceptor is transferred to the dispersed aqueous phase 214, and applied microwave energy is also absorbed directly by the dispersed aqueous phase 214. The energy absorbed by the dispersed aqueous phase 214 simultaneously causes evaporation of liquid water from the dispersed aqueous phase 214 and helps transform the sealed microwavable package 28 into the microwaved package 30, as best depicted in FIG. 4. When the puffing or popping of the puffable food pellets 12 has slowed to the very slow rate, microwave energy application to the food intermediate 14 may permissibly continue for a brief time that is adequate to evaporate the excess moisture content of the dispersed aqueous phase 214 that provides the buffer against burning, scorching, or dry cooking of the sweetening agent 134. However, microwave energy application to the food intermediate 14 preferably ceases when the puffing or popping rate has slowed to the very slow rate, since the fat continuous phase 212 will typically contain a sufficient amount of excess energy to support evaporation of the excess moisture content of the dispersed aqueous phase 214 without continued microwave energy application.

When the metallic susceptor is not included in the package 28, microwave energy transfer to the dispersed aqueous phase 214 will tend to occur at a greater rate than microwave energy transfer to the fat(s) 112 of the fat continuous phase 212, on a weight basis. Therefore, when the metallic susceptor is not included in the package 28, more careful control of the microwave power may be needed to avoid prematurely exhausting the excess moisture content of the dispersed aqueous phase 214. As another alternative, when the metallic susceptor is not included in the package 28, the excess moisture content of the dispersed aqueous phase 214 may be enhanced somewhat to balance the enhanced relative rate of microwave energy application to the dispersed aqueous phase 214.

After puffing of the puffable food pellets 12 (or popping of the raw corn kernels 26) has ended, the residual form of the coating blend 10 that covers the puffed food pellets 32 (or the popped corn kernels 34) quickly reacts to form the coating 36 on the puffed food pellets 32 (or on the popped corn kernels 34). This reaction of the coating 36 includes any reaction(s) that include the sweetening agent 134, such as crystallizing and/or caramelizing reactions that include the sweetening agent 134.

The coating 36 that is formed on the puffed food pellets 32 (or on the popped corn kernels 34) is fat continuous and, though the water content of the coating 36 is reduced as compared to the water content of the coating blend 10, has a water-in-oil (or oil-in-water-in-oil) emulsion form, much like the coating blend 10. The fat-continuous nature of the coating 36 allows the coated puffed food product 38 to readily slide out of the microwaved package 30, with little, and preferably no, sticking of the coated puffed food product 38 within the microwaved package 30, despite the substantial content of the sweetening agent 134 and/or derivatives of the sweetening agent 134, in the coating 36. Likewise, the fat-continuous nature of the coating 36 suppresses, and preferably eliminates, clumping or sticking of individual pieces of the coated puffed food product 38 to each other, despite the substantial content of the sweetening agent 134 and/or derivatives of the sweetening agent 134, in the coating 36.

Furthermore, due to the homogeneous, uniform dispersal of the flavor component(s) 118 and the color component(s) 120 within the coating blend 10, and the coordinated transformation of the coating blend 10 into the coating 36 as the puffed food pellets 32, such as the popped corn kernels 34, are being formed and continuing after the puffed food pellets 32 are fully formed, each of the different pieces of the coated puffed food product 38 exhibit an amazing uniformity of both color and flavor that consumers appreciate. Also, the coating 36 is substantially continuous, and preferably fully continuous, on all exterior surfaces (not shown) of the coated puffed food product 38. Likewise, the thickness of the coating 36 is predominantly the same, and preferably is essentially the same, from place to place on each individual piece of the coated puffed food product 38 and from place to place on different pieces of the coated puffed food product 38. Consumers will really appreciate the non-sticky nature of the coated puffed food product 38 with the continuous form of the coating 36 that evenly distributes flavor throughout the coated puffed food product 38. Consumers will also appreciate the simple, single step method of forming the popped corn kernels 34 and forming the coating 36 on the popped corn kernels 34.

Various analytical techniques are employed herein. An explanation of these techniques.

PROPERTY DETERMINATION AND CHARACTERIZATION TECHNIQUES

Conductivity

The existence of the water-in-oil (or oil-in-water-in-oil) emulsion form of a particular sample that is produced in accordance with the present invention, such as the coating blend intermediate 138, of coating blend 10, and the coating 36, may be ascertained by reference to the conductivity of the particular sample, such as by reference to the conductivity of the coating blend intermediate 138, the coating blend 10, and the coating 36, respectively. If the conductivity of the particular sample, such as the coating blend intermediate 138, the coating blend 10, or the coating 36, is 0 micro-siemens per centimeter ($\mu$S/cm) at a sample temperature of about 25° C., the water phase of the particular sample may be considered to be discontinuous and thus the fat phase (or the exterior fat phase) of the particular sample may be considered to be continuous. Similarly, the particular sample, such as the coating blend intermediate 138, the coating blend 10, or the coating 36, may be considered to be in the form of a water-in-oil emulsion or an oil-in-water-in-oil emulsion when the particular sample has a conductivity of 0) micro-siemens per centimeter at a sample temperature of about 25° C.

Conductivity determinations may be made using a Model No. 01481-61 Conductivity Meter that is available from Cole-Parmer Instrument Co. of Vernon Hills, Ill. using the procedure set forth in the instructions accompanying the Model No. 01481-61 Conductivity Meter. All conductivity values made with the Model No. 01481-61 Conductivity Meter are made with the sample at a temperature of about 25° C., unless otherwise indicated.

Alternatively, conductivity determinations may be made using a Sears Model No. 82310 Conductivity Meter that is available from Sears Roebuck Co. of Hoffman Estates, Ill. using the procedure set forth in the instructions accompanying the Model No. 82310 Conductivity Meter. All conductivity values made with the Model No. 82310 Conductivity Meter are made with the sample at a temperature of about 25° C., unless otherwise indicated. At a sample temperature of about 25° C., with the sample probes of the Model No. 82310 Conductivity Meter positioned about one centimeter apart and in contact with the sample, and with the Model No. 82310 Conductivity Meter set on the 100× scale, samples of the coating blend intermediate 138, the coating blend 10, and the coating 36 will cause no movement of the indicator needle of the Model No. 82310 Conductivity Meter when the samples of the coating blend intermediate 138, the coating blend 10, and the coating 36 are in the form of either a water-in-oil emulsion or an oil-in-water-in-oil emulsion in accordance with the present invention.

Flavor Stability

Flavor stability in a particular sample of the coated puffed food product 38 may be determined after first preparing a first sample and a second sample of the food intermediate 14 (combination of the coating blend 10 and the puffable food pellets 12). The first sample of the food intermediate 14 is heated in a microwave oven immediately after preparation to puff the puffable food pellets 12 and form the coating 36 on the puffed food pellets 32, whereas the second sample of the food intermediate 14 is stored for the selected sample period (such as six months) at the selected sample storage temperature (such as at a temperature of about 70° F.) before the second sample of the food intermediate 14 is heated in a microwave oven to puff the puffable food pellets 12 and form the coating 36 on the puffed food pellets 32.

Both the first sample of the food intermediate 14 and the second sample of the food intermediate 14 should be identical, or virtually identical, to each other, though the first sample of the food intermediate 14 and the second sample of the food intermediate 14 are necessarily prepared at different times to allow the coated puffed food product 38 prepared from the first sample of the food intermediate 14 and the coated puffed food product 38 prepared from the second sample of the food intermediate 14 to be taste tested at the same time by the taste panel, shortly after the coated puffed food product 38 has been prepared from both the first and second samples of the food intermediate 14. Likewise, the flavor stability of the coating blend 10, prior to forming the food intermediate 14, may be evaluated by allowing the selected sample period to encompass storage of the coating blend 10 prior to preparing the second sample of the food intermediate 14, while using fresh, newly prepared coating blend 10 to prepare the first sample of the food intermediate 14.

The coated puffed food products 38 prepared from the first and second samples of the food intermediate 14 are puffed in preparation for flavor evaluation by a panel of at least 6 trained sensory experts. The coated puffed food products 38 prepared from the first and second samples of the food intermediate 14 are allowed to rest for at least about one minute to allow time for the coating 36 to become firmer. The coated puffed food products 38 prepared from the first and second samples of the food intermediate 14 are each sampled by members of the taste panel at the same time to ensure that the coated puffed food products are at about the same temperature during taste testing. If the taste testing panel observes no difference in flavor between the two coated puffed food products 38, then the (1) food intermediate 14 or (2) the food intermediate and the coating blend 10, as appropriate, are said to exhibit excellent flavor stability with no, or essentially no, flavor degradation, despite storage of the second sample of the food intermediate 14 for the selected sample period at the selected sample storage temperature.

Wicking

The amount of wicking from a 35 gram sample of the coating blend 10, during a selected determination period at a selected determination temperature, may be determined in accordance with this Wicking procedure. First, the 35 gram sample of the coating blend 10 is placed in an enclosure under a vacuum of about 20 inches of mercury to suction any wickable components from the coating blend 10. The vacuum source should be placed beneath the sample to allow any wicked liquid components to fall into a collection dish. The tare weight of the collection dish should be determined prior to starting the wicking determination. The sample of the coating blend 10 should be maintained in an enclosure that is adequate to maintain the atmosphere about the coating blend 10 at the selected wicking determination temperature for the duration of the selected determination period. After completion of the selected determination period, the collection dish is weighed and the tare weight of the collection dish is subtracted to determine the amount of liquid components removed from the costing blend 10 sample by the applied vacuum. The weight of the liquid components removed by the applied vacuum (also referred to as "suctioned liquid components") may then be rated based on interpretation standards that are presented in Table 1 below:

TABLE 1

| Rating | Amount of suctioned liquid components (grams)[#] |
|---|---|
| Good | None |
| Trace | Less than 2 |
| Medium | About 2 to about 5 |
| Large | More than about 5 |

[#]based on a popcorn bag sample containing about 70 grams of a raw corn kernel 26/coating blend 10 mixture at a ratio of about 35 parts by weight raw corn kernels 26 to about 35 parts by weight of the coating blend 10.

Reflectance Spectra

The color of any two samples of an identical stream that is prepared in accordance with the present invention may be characterized in terms of $L^*$ (lightness/darkness), $a^*$(redness/greenness), and $b^*$ (yellowness/blueness) values in the CIELAB colorspace. Increasing $L^*$ values ($L^*$ moves toward +100) correlate to increasing lightness (increasing "whiteness"); increasing $a^*$ values ($a^*$ moves toward +60 and thereby becomes either more positive or less negative) correlate to increasing redness; and increasing $b^*$ values ($b^*$ moves toward +60 and thereby becomes either more positive or less negative) correlate to increasing yellowness. Correspondingly, decreasing $L^*$ values ($L^*$ moves toward 0) correlate to decreasing lightness (increasing "blackness"); decreasing $a^*$ values ($a^*$ moves toward −60 and thereby becomes either less positive or more negative) correlate to increasing greenness (decreasing "redness"); and decreasing $b^*$ values ($b^*$ moves toward −60 and thereby becomes either less positive or more negative) correlate to increasing blueness (decreasing "yellowness").

Color differences between two samples of a particular stream or between samples of different streams may be determined using the following equation:

$$\Delta E^*_{ab} = [(\Delta L^*)^2 + (\Delta a^*)^2 + (\Delta b^*)^2]^{0.5}.$$

The numerical value found by calculating $\Delta E^*_{ab}$ indicates the size of the color difference between the two samples, but does not characterize how the colors of the two samples are different. When $\Delta E^*_{ab}$ is about 5 or less, the differences in color between the two samples being compared are typically unable to be visually recognized by people with good eyesight and consequently are said to demonstrate no color degradation between two identically prepare samples that are stored for different storage periods at different storage temperatures.

Unless otherwise indicated, all reflectance spectra may be determined in accordance with the following procedure that relies on a commercially available reflectometer, the Hunter LabScan II Colorimeter, that is available from Hunter Associates Laboratory, Inc ("Hunter") of Reston, Va. A white calibration standard, part number 11-010850, and a black calibration standard, part number 11-005030, each available from Hunter, may be used to calibrate the Hunter LabScan II Colorimeter. Spectral data obtained by the Hunter LabScan II Colorimeter are converted by the Colorimeter into various spectral values, including the CIELAB colorspace variables: $L^*$ (lightness), $a^*$(redness/greenness), and be (yellowness/blueness).

Before the reflectance spectra are evaluated for a particular sample, the Hunter LabScan II Colorimeter is calibrated to the appropriate calibration standards supplied by Hunter. First, the Colorimeter takes a reading after being placed against the white calibration standard (part number 11-010850) supplied by Hunter. Then, the Colorimeter takes another reading after being placed against the black calibration standard (part number 11-005030) supplied by Hunter. The Colorimeter software then evaluates the two readings and makes any necessary calibration adjustments before reflectance spectra of samples are measured.

The reflectance spectrum of a particular powdered sample (spray-dried or freeze-dried to less than 5% moisture, by weight) is evaluated by placing a powder cup (filled about 1 to 2 centimeters high with the sample) on the Hunter LabScan II Colorimeter measurement window. A suitable powder cup may be obtained from Agtron Instruments, a division of Magnuson Engineers, Inc., of San Jose, Calif. The Colorimeter is programed to characterize spectral data in terms of L*, a*, and b*. Determination of the L*, a*, and b* values for a particular dried sample entails five separate measurements of spectral data. Thus, the L*, a* and b* values for each dried sample are based on an average of five separate spectral measurements.

Color degradation in a particular solid sample, such as in a sample of the coated puffed food product 38, may be determined after first preparing a first sample and a second sample of the food intermediate 14 (combination of the coating blend 10 and the puffable food pellets 12). The first sample of the food intermediate 14 is heated in a microwave oven immediately after preparation to puff the puffable food pellets 12 and form the coating 36 on the puffed food pellets 32, whereas the second sample of the food intermediate 14 is stored for the selected sample period (such as six months) at the selected sample storage temperature (such as at a temperature of about 70° F.) before the second sample of the food intermediate 14 is heated in a microwave oven to puff the puffable food pellets 12 and form the coating 36 on the puffed food pellets 32.

Both the first sample of the food intermediate 14 and the second sample of the food intermediate 14 should be identical, or virtually identical, to each other, though the first sample of the food intermediate 14 and the second sample of the food intermediate 14 are necessarily prepared at different times to allow the coated puffed food product 38 prepared from the first sample of the food intermediate 14 and the coated puffed food product 38 prepared from the second sample of the food intermediate 14 to be color tested at the same time without subjecting the first sample of the food intermediate 14 to any storage time. After preparation of the coated puffed food products 38 from the first sample of the food intermediate 14 and from the second sample of the food intermediate 14, respectively, the two coated puffed food products 38 are separately and individually ground to the consistency of a powder and are each dried, as necessary, to less than 5% moisture, by weight, using any conventional drying equipment, such as spray-equipment or freeze-drying equipment.

The two powdered samples of the coated puffed food product 38 are then separately placed in individual powder cups (filled about 1 to 2 centimeters high with the sample) that are sequentially placed on the Hunter LabScan II Colorimeter measurement window and the L*, a*, and b* values for the two powdered samples are separately determined. The $\Delta E^*_{ab}$ value is then calculated to compare the color difference between the two powdered samples. If the calculated $\Delta E^*_{ab}$ is about 5 or less, the differences in color between the two powdered samples being compared is said to demonstrate no color degradation between the two identically prepare samples of the two coated puffed food products 38, despite storage of the second sample of the food intermediate 14 for the selected sample period at the selected sample storage temperature.

The reflectance spectra of a particular fluid sample, such as a fluid sample of the coating blend 10, is evaluated after placing the fluid sample in a sample cup and then placing the sample cup on the Hunter LabScan 11 Colorimeter measurement window. A suitable sample cup for the fluid sample may be obtained from Agtron Instruments of San Jose, Calif. A white reflectance disk and ring set that are available from Hunter are used in conjunction with the fluid filled cell in accordance with instructions available from Hunter to qualitatively characterize light that is reflected back to the Colorimeter by the reflectance disk after passing from the Colorimeter through the sample. The Colorimeter is programed to characterize spectral data in terms of L*, a*, and b*. Determination of the L*, a*, and b* values for a particular fluid sample entails five separate measurements of spectral data. Thus, the L*, a* and b* values for each fluid sample are based on an average of five separate spectral measurements.

Color degradation in a particular fluid sample, such as in a fluid sample of the coating blend 10 (as present in the food intermediate 14) may be determined after first preparing a first sample and a second sample of the food intermediate 14 (combination of the coating blend 10 and the puffable food pellets 12). The second sample of the food intermediate 14 is stored for the selected sample period (such as six months) at the selected sample storage temperature (such as at a temperature of about 70° F.) and the first sample of the food intermediate 14 is prepared at the end of the selected storage period of the second sample. Both the first sample of the food intermediate 14 and the second sample of the food intermediate 14 should be identical, or virtually identical, to each other, though the first sample of the food intermediate 14 and the second sample of the food intermediate 14 are necessarily prepared at different times to allow testing of the first sample of the food intermediate 14 and the second sample of the food intermediate 14 at the same time, without allowing the first sample of the food intermediate to undergo any storage.

Two separate samples of the coating 10 are then obtained from the first sample of the food intermediate 14 and from the second sample of the food intermediate 14, are mildly heated (at about 75° C.) to separately liquid the two samples, and are separately placed in the fluid sample cup. The L*, a*, and b* values for the two coating 10 samples are then separately determined in accordance with the procedure described above for fluid samples. The $\Delta E^*_{ab}$ value is then calculated to compare the color difference between the two coating 10 samples. If the calculated $\Delta E^*_{ab}$ is about 5 or less, the differences in color between the two coating 10 samples being compared is said to demonstrate no color degradation between the two identically prepare samples of the coating 10, despite storage of the second sample coating 10, as part of the food intermediate 14, for the selected sample period at the selected sample storage temperature. A similar comparison study may be conducted for two samples of the coating blend 10 where the samples of the coating blend 10 are never combined with the puffable food pellets 12.

Consistency

Unless otherwise indicated, all consistencies (as reflected by depth of penetration by a weighted cone) recited herein may be determined using a Digital Penetrometer (Catalog Number 73500) that may be obtained from Precision Scientific Petroleum Instruments of Arlington Heights, Ill., in combination with a 45 gram ASTM Cone, in accordance with the procedure set forth in the instruction manual that accompanies the Precision Scientific Digital Penetrometer (Catalog Number 73500). All penetrometer determinations are made with the sample at a temperature of about 25° C. (77° F.), unless otherwise indicated.

Fat and Moisture Analysis

Unless otherwise indicated, all determinations of moisture concentration and fat concentration may be made in accordance with the following procedure. This procedure involves the sequential determination of moisture concentration and then the fat concentration on a particular sample. Specifically, a weighed sample is first heated to evaporate moisture and then is re-weighed to measure the moisture lost. Then, fat is extracted from the sample using petroleum ether, and the solids remaining in the sample are then re-weighed to determine the fat concentration. These procedures for moisture concentration and fat concentration are detailed more fully below.

All samples are refrigerated at 4° C., unless being prepared for sample analysis. Samples that are being prepared for analysis must first be tempered to room temperature (about 20° C. to about 25° C.) prior to sample analysis.

Moisture Determination

To determine the moisture concentration of an original sample, a clean, dry aluminum beaker that has been tempered to room temperature (about 20° C. to about 25° C.) is weighed on an analytical balance with a sensitivity of 0.1 milligrams. The material to be sampled is then warmed and mixed to permit a representative sample to be taken. This warming of the material to be sampled may be done by heating the material to be sampled in a water bath at a temperature between about 32° C. and about 35° C. If any phase separation occurs during the heating, the material to be sampled may alternatively be warmed at room temperature until the material reaches a consistency that permits mixing and subsequent sampling of the material.

About 10 grams of a well mixed sample (the "original sample") is placed into the aluminum beaker and accurately weighed on the analytical balance. The sample in the aluminum beaker is then heated on a hot plate or an equivalent heat source, while swirling the sample continuously to avoid spattering and burning of any solids contained in the sample. Heating is continued to cause evaporation of water from the sample until all foaming and bubbling of the sample has stopped and any solids contained in the sample appear light brown in color. Care should be taken to obtain a uniform color between each sample being analyzed for water concentration. If a dark brown color appears in the sample that is being heated, the solids content of the sample have been burned and this sample should be rerun.

After evaporation on the hot plate has been completed, the aluminum beaker is cooled to room temperature (about 20° C. to about 25° C.). Thereafter, the aluminum beaker and its contents are weighed on the analytical balance and the weight is recorded as the "weight of beaker+moisture-free residue.

The weight percent of moisture in the sample, based on the total weight of the sample, may be determined in accordance with the following calculations:

$$\text{Weight of Original Sample} = \left[ \begin{array}{c} (\text{Weight of beaker} + \text{original sample}) - \\ \text{weight of beaker} \end{array} \right]$$

$$\% \text{ Moisture} = \frac{(\text{Weight of beaker} + \text{original sample}) - (\text{Weight of beaker} + \text{moisture-free residue})}{\text{Weight of Original Sample}} \times 100$$

Fat Analysis

The fat concentration of the original sample is then determined by placing the aluminum beaker containing the moisture-free residue from the moisture-determination step in a slanted beaker holder under an exhaust hood. Then, 100 milliliters of petroleum ether is measured into the aluminum beaker. Next, the mixture of the sample and the added ether is stirred using a rubber policeman to dissolve the fat contained in the sample. Stirring is then stopped and the sample is allowed to rest for at least about 3 minutes to permit any solids in the sample to settle. Thereafter, using a vacuum source, the ether/fat mixture is carefully suctioned from the beaker, while being careful not to suction any of the solids that have dropped to the bottom of the beaker.

Then, 75 milliliters of petroleum ether is measured into the beaker and the contents of the beaker are again stirred with the rubber policeman to dissolve additional fat. Stirring is again stopped and the beaker is allowed to rest at least 3 minutes to permit solids to settle to the bottom of the beaker. The vacuum source is again applied to suction the mixture of ether and fat from the beaker, while being careful not to suction any solids from the beaker.

Fifty milliliters of petroleum ether is placed into the beaker and stirred again with the rubber policeman to dissolve any fat remaining in the sample. The beaker is allowed to rest at least three minutes to permit settling of any solids in the beaker. The vacuum apparatus is again applied to carefully suction the mixture of fat and ether from the beaker, while again being careful not to suction any solids from the beaker.

The beaker is allowed to dry under the fume exhaust hood until the beaker and its contents attain a constant weight, as determined by measurement on the analytical balance. After the beaker has attained a constant weight, the weight of the beaker and its contents is determined and this weight is recorded as "weight of beaker+fat-free residue". Then, the weight percent of fat in the original sample, based upon the total weight of the original sample, is calculated using the following formula:

$$\% \text{ Fat} = \frac{(\text{Weight of beaker} + \text{Moisture-free residue}) - (\text{Weight of beaker} + \text{fat-free residue})}{\text{Weight of Original Sample}} \times 100$$

The present invention is more particularly described in the following Examples that are intended as illustrations only since numerous modifications and variations within the scope of the present invention will be apparent to those skilled in the art.

EXAMPLES

Example 1

This example illustrates a method of preparing a sweet coating blend in accordance with the present invention. One hundred twenty-four and six tenths pounds of SATIN SWEET® 65% high maltose corn syrup obtained from Cargill Sweeteners, Inc. of Minnetonka, Minn. was placed in a cone-bottomed tank. The cone bottom tank was jacketed. Steam was passed through the jacketing to heat the SATIN SWEET® corn syrup to a temperature ranging from about 135° F. to about 140° F.

A thirty gallon swept-wall jacketed stainless steel tank was also provided. This swept-wall tank was a Model No. 25U tank obtained from Lee Industries, Inc. of Phillipsburg, Pa. The swept-wall tank included two agitators. One of the agitators was a center post low frequency (28 to 35 revolutions per minute) agitator with sweep blades that were in contact with all interior surfaces of the swept wall tank that were in contact with the fluids. The second agitator was a high frequency (1500 revolutions per minute), high shear mixer positioned between the center port of the center post low frequency agitator and the vertical peripheral wall of the swept-wall tank.

Butterfat, partially hydrogenated soybean oil, DIMO-DAN™ O distilled monoglyceride-diglyceride blend (obtained from Grinsted Ingredients, Inc. of New Century, Kans.), and de-oiled soy lecithin were added to the swept-wall tank. The concentrations and weights of these four components in the swept-wall tank are presented in Table 2 below:

TABLE 2

| INGREDIENT | AMOUNT ADDED | WEIGHT PERCENT* |
| --- | --- | --- |
| Butterfat | 34 pounds | 49.71% |
| Partially Hydrogenated Soybean Oil | 34 pounds | 49.71% |
| DIMODAN ™ O Distilled Monoglyceride-Diglyceride Blend | 90 grams | 0.29% |
| De-oiled Soy Lecithin | 90 grams | 0.29% |

*Based upon the total weight of all four components

These four ingredients (fat blend) were heated in the swept-wall tank to a temperature of about 140° F. by passing steam through the jacketing while operating both agitators. Thereafter, while continuing to operate both agitators, cooling water was passed through the jacketing and the fat blend was cooled to a temperature in the range of about 85° F. to about 90° F.

Then, with both agitators still operating in the swept-wall tank, the SATIN SWEET® corn syrup, still at a temperature ranging from about 135° F. to about 140° F., was slowly added to the fat blend in the swept-surface tank at a rate of about 0.15 weight percent to about 0.4 weight percent of the SATIN SWEET® corn syrup per second, where the weight percent of the SATIN SWEET® corn syrup was based upon the total weight of the SATIN SWEET® corn syrup. Thus, the SATIN SWEET® corn syrup was added to the fat blend in the swept-surface tank at a rate ranging from about 0.187 pounds per second to about 0.498 pounds per second.

During this addition, the cooling water in the jacketing of the swept-wall tank was controlled to keep the overall temperature of the swept-wall tank contents in the range of about 85° F. to about 90° F. The sweep blades of the center-post low frequency agitator prevented any significant amount of the corn syrup/fat blend mixture from congealing on the tank walls during and after addition of the corn syrup.

After the corn syrup addition was completed, and the corn syrup and fat blend were well mixed, with the corn syrup well dispersed into fine droplets within the fat blend, the corn syrup and fat blend, still at a temperature in the range of about 85° F. to about 90° F., was pumped using a MOYNO® pump (obtained from Moyno, Inc. of Springfield, Ohio) through a ½" inside diameter line to a swept surface heat exchanger. The mixture was pumped through the ½" inside diameter line at a linear rate ranging from about 75 feet per minute to about 90 feet per minute, and thus flowed through the ½" inside diameter line at the rate of about 0.8 to about 0.9 gallons per minute.

The swept surface heat exchanger used in this example was a VOTATOR™ pilot plant swept surface heat exchanger that is available from Waukesha Cherry Burrell of Delavan, Wis. This VOTATOR™ pilot plant swept surface heat exchanger had a barrel diameter of about two inches and a barrel length of about twelve inches. With the VOTATOR™ pilot plant swept surface heat exchanger operated at about 500 to about 550 revolutions per minute, the corn syrup/fat blend mixture entered the swept surface heat exchanger at a temperature within the range of about 85° F. to about 90° F., exited the exchanger at a temperature within the range of about 65° F. to about 75° F., and had a flow rate through the exchanger of about eight to about ten pounds per minute. In this VOTATOR™ pilot plant swept surface heat exchanger example, the temperature change from the feed input to the product discharge was about 10° F. to about 25° F. at the about eight to about ten pounds per minute flow rate of the corn syrup/fat blend through the VOTATOR™ pilot plant swept surface heat exchanger.

The product that exited the VOTATOR™ pilot plant swept surface heat exchanger initially had a rather fluid consistency, but quickly increased in consistency within about five to ten minutes to a consistency intermediate between a stick margarine and a tub margarine. Conductivity determinations were made immediately after the product exited the VOTATOR™ pilot plant swept surface heat exchanger and again about ten minutes later after the product consistency had increased.

The conductivity determinations were made with the Sears Model No. 82310 Conductivity Meter that is available from Sears Roebuck & Co. using the procedure set forth in the instructions accompanying the Model No. 82310 Conductivity Meter at a sample temperature in the range of about 65° F. to about 75° F. and with the sample probes of the Model No. 82310 Conductivity Meter positioned about one centimeter apart and in contact with the sample. The Model No. 82310 Conductivity Meter was set on the 1000× scale. No movement of the indicator needle of the Model No. 82310 Conductivity Meter was observed when the two conductivity measurements were made. Thus, both samples of the coating blend product exhibited no conductivity (0 micro-siemens per centimeter ($\mu$S/cm)) at a sample temperature of about 65° F. to about 75° F. This demonstrates that both samples of the coating blend product had a discontinuous water phase and a continuous fat phase and were in the form of a water-in-oil emulsion in accordance with the present invention.

Example 2 and Comparative Examples 1 and 2

This section concerns a coating blend prepared in accordance with the present invention (Example 2) along with two coating blends of the prior art (Comparative Examples 1 and 2). The components and the component concentrations are very similar in the coating blend of Example 2 and the coating blend of Comparative Example 2, with the exception that the coating blend of Example 2 contains a small amount of DIMODAN™ O distilled monoglyceride-diglyceride blend that is not included in the coating blend of Comparative Example 2. The components and component concentrations in the coating blend of Comparative Example 1 are similar to those of the coating blend of Comparative Example 2 and the coating blend of Example 2, with the exception that the coating blend of Comparative Example 1 excludes the butterfat component that is included in the coating blends of Comparative Example 2 and Example 2 and excludes the small amount of DIMODAN™ O distilled monoglyceride-diglyceride blend that is included in the coating blend of Example 2.

After preparation, the coating blends of Example 2 and of Comparative Examples 1 and 2 are placed in a standard microwavable popcorn bag along with raw poppable corn kernels. Thereafter, the coating blends and raw poppable corn kernels of Example 2 and of Comparative Examples 1 and 2 are placed in a conventional microwave oven and heated via application of microwave energy to pop the corn kernels and form a coating on the popped corn kernels. The coating that is formed on the popped corn kernels along with any scorching and/or burning of the coating are documented and evaluated for Comparative Examples 1 and 2 along with Example 2.

This evaluation demonstrates that the combination of the coating blend of Example 2 with the raw poppable corn kernels, upon being microwaved, is effective to create a popped corn product with a high percentage of popped corn kernels and with a continuous and uniform coating on the popped corn kernels. This evaluation further that the coating blend of Example 2 allows an extended period of about 30 seconds of microwave heating after completion of kernel popping and coating formation without any burning of the coating. On the other hand, when using the coating blends of Comparative Examples 1 and 2, the coating that is formed on the popped corn kernels is quickly scorched and thereafter burned after corn kernel popping is complete and the coating is formed. Furthermore, the coating formed on the popped corn kernels in Comparative Examples 1 and 2 was less continuous and less uniform, as compared to the coating that was formed on the popped corn kernels in Example 2.

Coating Blend Formulation For Comparative Examples 1 and 2

In Comparative Examples 1 and 2, a control slurry was first prepared. This control slurry was prepared by warming 624 grams of high maltose corn syrup in a suitable heated vessel. The high maltose corn syrup was heated to reduce the viscosity of the corn syrup in preparation for blending the corn syrup with other components of the slurry. Then, 160 grams of melted partially hydrogenated soybean oil was added and blended with the high maltose corn syrup in the heated mixing vessel. Thereafter, 187 grams of Bakers® Special Sugar was added to the heated mixing vessel and blended with the corn syrup/soybean oil mixture. Finally, 1 gram of fluid soy lecithin was added to the mixing vessel and blended with the corn syrup/soybean oil/sugar mixture. This mixture of four components was then blended further with agitation to form a homogenous high fat syrup that constituted the control slurry.

The control slurry constituted the coating blend of Comparative Example 1. The coating blend of Comparative Example 2 was formed by combining 18.7 grams of melted butterfat with 100 grams of the control slurry, where the control slurry was warmed to aid blending of the melted butterfat with the control slurry. The butterfat/control slurry mixture of Comparative Example 2 was blended under agitation sufficient to form the coating blend of Comparative Example 2 as a homogenous mixture. Both the coating blend of Comparative Example 1 and the coating blend of Comparative Example 2 had a conductivity significantly greater than 0 micro-siemens per centimeter ($\mu$S/cm) at a sample temperature of about 25° C. Thus, both the coating blend of Comparative Example 1 and the coating blend of Comparative Example 2 constituted water continuous mixtures of water and fat.

Preparation of Coating Blend in Example 2

The coating blend of Example 2 included all of the components of the coating blend of Comparative Example 2 and had predominantly the same component concentrations of the coating blend of Comparative Example 2 with the exception that the coating blend of Example 2 included a small amount of DIMODAN™ O distilled monoglyceride-diglyceride blend that was not present in the coating blend of Comparative Example 2. These strong component and component concentration similarities notwithstanding, the components of the coating blend of Example 2 were combined in accordance with the technique of the present invention to form the coating blend of Example 2 as a water-in-oil emulsion, in accordance with the present invention. Thus, even though all of the components of the control slurry were used in the coating blend of Example 2 at virtually the same concentrations as the concentrations present in the control slurry, the control slurry was not prepared in Example 2. Instead, the coating blend of Example 2 was prepared as described below.

Two jacketed mixing vessels were used to make the coating blend of Example 2. The first jacketed mixing vessel was used to form a sweetener blend, and a second jacketed mixing vessel was used to form a fat blend and was thereafter also used to combine the sweetener blend with the fat blend. The first jacketed mixing vessel allowed for heating of added ingredients along with temperature maintenance of added ingredients and additionally included a high frequency agitator for blending added components and forming the sweetener blend. The second jacketed mixing vessel likewise supported heating of added components along with temperature maintenance of added components. However, in addition to a high frequency agitator for blending added components, the second jacketed mixing vessel additionally included an agitation mechanism that allowed for periodic sweeping of internal surfaces of the vessel to avoid fat agglomeration on the walls of the mixing vessel.

The coating blend was formed by first heating 624 grams of the high maltose corn syrup in the first jacketed mixing vessel to a temperature ranging from about 135° F. to about 140° F. Then, with the high frequency agitator operating, 187 grams of Bakers® Special Sugar was combined and homogeneously blended with the high maltose corn syrup in the first jacketed mixing vessel to form the sweetener blend. The sweetener blend was thereafter maintained at the temperature ranging from about 135° F. to about 140° F. in the first jacketed mixing vessel.

Next, 160 grams of the partially hydrogenated soybean oil that was employed in forming the coating blends of Comparative Examples 1 and 2 was melted and placed in the second jacketed mixing vessel. Then, about 182 grams of melted butterfat was added to the melted partially hydrogenated soybean oil in the second jacketed mixing vessel and was homogeneously blended with the melted partially hydrogenated soybean oil with the aid of the high frequency agitator. This blend of the soybean oil and the butterfat was then heated to a temperature of about 140° F. Then, 1 gram of fluid soy lecithin and 1 gram of DIMODAN™ O distilled monoglyceride-diglyceride blend (obtained from Grinsted Ingredients, Inc. of New Century, Kans.) were added to the second jacketed mixing vessel and homogeneously blended with the butterfat/soybean oil mixture. Thereafter, while operating both the high frequency agitator and the wall sweeping agitating equipment, the resulting fat blend was cooled to a temperature in the range of about 85° F. to about 90° F.

Next, with both high frequency agitator operating and with the wall sweeping agitation equipment operating, the sweetener blend, still at a temperature ranging from out 135° F. to about 140° F., was slowly added to the fat blend in the second jacketed mixing vessel at a rate of about 0.15 weight percent to about 0.4 weight percent of the sweetener blend per second, where the weight percent of the sweetener blend was based upon the total weight of the sweetening blend. Thus, the sweetener blend was added to the fat blend in the second jacketed mixing vessel at a rate ranging from about 1.2 grams per second to about 3.2 grams per second. During this addition, the overall temperature of the contents in the second jacketed mixing vessel was maintained in the range of about 85° F. to about 90° F. Additionally, the wall sweeping agitation equipment prevented any significant amount of material from congealing on the vessel walls during and after addition of the sweetener blend.

After the sweetener blend was added, and the sweetener blend and the fat blend were well mixed, it was observed that the sweetener blend was well dispersed into fine droplets within the fat blend. After preparation, the mixture of the sweetener blend and the fat blend was quickly cooled in an ice bath with heavy agitation to form the coating blend of Example 2. This agitation was sufficient to support the formation of fat crystal nuclei and fat crystalline structures in the coating blend thereby produced.

It was observed that the coating blend had a rather fluid consistency, initially, but quickly increased in consistency within about 5 to about 10 minutes to a consistency intermediate between the consistency of a stick margarine and the consistency of a tub margarine. Conductivity determinations were made immediately after the coating blend was produced. These conductivity determinations demonstrated that the coating blend exhibited no conductivity (0 microsiemens per centimeter) at a sample temperature of about 65° F. to about 75° F. This demonstrates that the coating blend of Example 2 had a discontinuous water phase and a continuous fat phase and was in the form of a water-in-oil emulsion in accordance with the present invention.

Microwave Testing of the Coating Blends of Comparative Examples 1 and 2 Versus the Coating Blend of Example 2

The coating blends of Comparative Examples 1 and 2 and the coating blend of Example 2 were separately combined with raw poppable corn kernels and placed on a conventional metallic susceptor pad in a conventional microwave popcorn bag to form a microwavable popcorn product. In Comparative Example 1, 100 grams of the coating blend (control slurry) of Comparative Example 1 was combined with 48 grams of the raw poppable corn kernels on the susceptor pad in each microwavable popcorn bag. In Comparative Example 2, 118.7 grams of the coating blend of Comparative Example 2 were combined with 48 grams of the raw poppable corn kernels on the susceptor pad in each microwavable popcorn bag. Finally, in Example 2, 118.8 grams of the coating blend of Example 2 were combined with 48 grams of the raw poppable corn kernels on the susceptor pad in each microwavable popcorn bag. Thus, in Comparative Examples 1 and 2 and in Example 2, each microwavable popcorn bag included the following components at the concentrations indicated in Table 3:

TABLE 3

| MICROWAVABLE POPCORN BAG | COATING BLEND | COMPARATIVE EXAMPLE 1 | | COMPARATIVE EXAMPLE 2 | | EXAMPLE 2 | |
|---|---|---|---|---|---|---|---|
| CONTENTS | COMPONENTS | Weight (g) | Weight % | Weight (g) | Weight % | Weight (g) | Weight % |
| Coating Blend | | 100 | 67.57% | 118.7 | 71.21% | 118.8 | 71.22% |
| | High Maltose Corn Syrup | 64.2 | 43.38% | 64.2 | 38.51% | 64.2 | 38.49% |
| | Baker's Special Sugar | 19.2 | 12.97% | 19.2 | 11.52% | 19.2 | 11.51% |
| | Partially Hydrogenated Soybean Oil | 16.5 | 11.15% | 16.5 | 9.90% | 16.5 | 9.89% |
| | Butterfat | 0.0 | 0.0% | 18.7 | 11.22% | 18.7 | 11.21% |
| | Soy Lecithin | 0.1 | 0.07% | 0.1 | 0.06% | 0.1 | 0.06% |
| | Distilled mono/diglyceride blend | 0.0 | 0.0% | 0.0 | 0.0% | 0.1 | 0.06% |
| Raw Corn Kernels | | 48 | 32.43% | 48 | 28.79% | 48 | 28.78% |

Thus, the components and component concentrations are very similar in Comparative Examples 2 and Example 2, with the exception that the coating blend of Example 2 included the small amount of the DIMODAN™ O distilled monoglyceride-diglyceride blend that was excluded from the coating blend of Comparative Example 2. Furthermore, as noted above, the coating blend of Example 2 was different from the coating blend of Comparative Example 2 in an additional way since the components of the coating blend of Example 2 were combined, in accordance with the present invention, in a different way from the way the components of the coating blend of Comparative Example 2 were combined.

Multiple microwavable bags of the Comparative Example 1 microwavable popcorn product, the Comparative Example 2 microwavable popcorn product, and the Example 2 microwavable popcorn product were prepared to allow different bags to be checked at different stages of the microwaving process. The microwavable popcorn bags used in Comparative Examples 1 and 2 and in Example 2 were identical. Additionally, in Comparative Examples 1 and 2 and in Example 2, the coating blend and the raw poppable corn kernels were each placed on the susceptor in identical fashion. Microwave popping was done in identical 700 watt microwave ovens equipped with turntables in Comparative Examples 1 and 2 and in Example 2. Finally, each microwave oven was allowed a three minute rest period between removal and placement of different microwavable popcorn bags.

Different microwavable popcorn bags containing the microwavable popcorn products of Comparative Examples 1 and 2 and of Example 2 were microwaved for times ranging from 2 minutes and 45 seconds (2:45) to 4 minutes and 30 seconds (4:30). Different bags were pulled out at 15 second increments to check for popping percentage and coating characteristics. The details for the various bags examined in Comparative Examples 1 and 2 and in Example 2 are provided in Table 4 below:

TABLE 4

| Microwave Duration (Mins:Secs) | Comparative Example 1 | Comparative Example 2 | Example 2 |
| --- | --- | --- | --- |
| 2:45 | underdone substantial % unpopped kernels | underdone substantial % unpopped kernels | No details noted |
| 3:00 | underdone substantial % unpopped kernels | underdone substantial % unpopped kernels | underdone substantial % unpopped kernels |
| 3:15 | substantially complete; low end OK | substantially complete; substantial % unpopped kernels | underdone |
| 3:30 | predominantly complete; center-point OK | predominantly complete; center-point OK | substantially complete; low end OK |
| 3:45 | complete, high end OK properly done | complete, high end OK properly done | predominantly complete; center-point OK |
| 4:00 | coating scorched but not burned | coating scorched but not burned | complete, high end OK properly done |
| 4:15 | coating scorched and burned | coating scorched and burned | complete, high end OK properly done |
| 4:30 | coating badly burned | coating badly burned | coating scorched but not burned |
| Comments | 15 second supply of excess water included in coating blend | 15 second supply of excess water included in coating blend | 30 second supply of excess water included in coating blend |

The details provided in Table 4 demonstrate that the coating blends of Comparative Example 1 and Comparative Example 2 behaved the same as each other, while the coating blend of Example 2 behaved differently from both the coating blends of Comparative Example 1 and Comparative Example 2.

In Table 4, the "underdone" notation means that formation of the coating on popped corn kernels had not progressed to a significant degree, whereas the "incomplete" notation shows that formation of the coating, while not complete on all corn kernels, had progressed to a significant degree on corn kernels that had actually popped. Finally, notations of "complete" indicate that coating formation on popped corn kernels had advanced to the maximum degree observed for the particular example or comparative example.

Also, in Table 4, the "low end OK", "center point OK", and "high end OK" notations refer to progression of the overall completion of the combination of both kernel popping and coating formation on popped kernels. The "low end OK", "center point OK", and "high end OK" notations are each located along an optimum range that takes into account both the overall completion of the combination of both kernel popping and coating formation on popped kernels for the particular sample being tested.

Thus, for a particular sample, the "low end OK" notation indicates that the percentage of popped corn kernels is at the low end of the optimum popped kernel range for that particular sample and that the kernels that had popped included a coating with a quality on the low end of the optimum coating quality range for that particular sample; the "center point OK" notation indicates that the percentage of popped corn kernels is at about the center of the optimum popped kernel range for that particular sample and that the kernels that had popped included a coating with a quality at about the center of the optimum coating quality range for that particular sample; while the "high end OK" designation indicates that the percentage of popped corn kernels is at the upper end of the optimum popped kernel range for that particular sample and that the kernels that had popped included a coating with a quality on the high end of the optimum coating quality range for that particular sample. It is noted that the low end OK, center point OK, and high end OK scale is individual to Comparative Example 1, Comparative Example 2, and Example 2. For example, the low end OK, center point OK, and high end OK evaluation standards for Example 2 were somewhat higher than those applied to either Comparative Example 1 or Comparative Example 2.

One important and surprising discovery was that the water continuous coating blends used in Comparative Examples 1 and 2, upon transformation into coatings on the popped corn kernels, tended to quickly become scorched and undesirably burned soon after corn kernel popping was complete. Essentially, after corn kernel popping was complete, while microwaving continued, the quality of the coating in terms of scorching and burning fell off the cliff, graphically, upon continued microwaving in both Comparative Examples 1 and 2. On the other hand, the coating blend of Example 2, upon transformation into the coating on popped corn kernels, exhibited a substantially longer period upon continued microwaving before undesirable levels of scorching and undesirable burning occurred. Graphically, rather than falling off a cliff, the quality of the completed coating on the popped corn kernels of Example 2, upon continued microwaving, began to gradually diminish only after a relatively long microwaving period after completion of corn kernel popping and coating formation. This is a surprising result, especially since the coating blend components and concentrations were very similar in Example 2 and in Comparative Example 2. Nonetheless, the coating blend of Comparative Example 2 performed much less desirably than the coating blend of Example 2.

The coating blends used in Comparative Examples 1 and 2 were found to have about a 15 second excess supply of water, as compared to the amount of water needed to form the coating on the popped corn kernels. On the other hand, the coating blend of Example 2 was found to have about a 30 second supply of excess water needed to form the coating on the popped corn kernels. This result is surprising, as well, since the amount of excess water in the coating blend of Example 2 was found to be about twice the amount of excess water present in the coating blend of Comparative Example 2, even though the coating blend components and coating blend component concentrations were very similar in Example 2 and Comparative Example 2.

Furthermore, despite this 15 second supply of excess water, the coatings formed in Comparative Examples 1 and 2, as reflected by the observed problem of the scorching and burning properties of the coating falling off the cliff graphically, had a quantitatively and qualitatively worse amount and degree of scorching and burning upon exhaustion of the 15 second excess water amount, as compared to the scorching properties observed for the coating formed in Example 2. Furthermore, at the time the coating was deemed to be completed on the popped corn kernels, the completed coating of Example 2 was observed to be substantially more complete and substantially more uniform in coverage and in thickness, as compared to the coatings formed on the popped corn kernels in Comparative Examples 1 and 2. Additionally, the coated popcorn emptied out of the bags in Example 2 much more easily and with much less sticking of unpopped popcorn kernels, as compared to the coated popcorn product produced in Comparative Examples 1 and 2. This effect is believed attributable, at least in part, to the fat continuous nature of the coating blend used in Example 2, versus the water continuous coating blends used in Comparative Examples 1 and 2.

Although the present invention has been described with reference to preferred embodiments, workers skilled in the art will recognize that changes may be made in form and detail without departing from the spirit and scope of the invention.

I claim:

1. A composition, the composition comprising:

a puffable food component; and an edible emulsion in coating relation with the puffable food component, the edible emulsion being a water-in-oil emulsion or an oil-in-water-in-oil emulsion and the edible emulsion comprising a sweetening agent, the edible emulsion transformable into a coating on a puffed form of the puffable food component upon application of energy to the composition that is sufficient to puff the puffable food component.

2. The composition of claim 1 wherein the edible emulsion comprises:

water;

fat or oil; and the sweetening agent, the concentration of the sweetening agent, based upon the dry weight of the sweetening agent, in the edible emulsion, based upon the total weight of the edible emulsion, ranging from about 40 weight percent to about 70 weight percent.

3. The composition of claim 1 wherein the puffable food component comprises raw poppable corn kernels.

4. A composition, the composition comprising:

a puffable food component; and a coating blend, the puffable food component located in coating relation with the coating blend, the coating blend comprising a sweetening agent, the coating blend effective for forming a fat continuous coating that comprises water on a puffed form of the puffable food component upon application of energy to the composition that is sufficient to puff the puffable food component.

5. The composition of claim 4 wherein the coating blend comprises:

water;

fat or oil; and the sweetening agent, the concentration of the sweetening agent, based upon the dry weight of the sweetening agent, in the coating blend, based upon the total weight of the coating blend, ranging from about 40 weight percent to about 70 weight percent.

6. The composition of claim 4 wherein the puffable food component comprises raw poppable corn kernels.

7. The composition of claim 4, wherein the fat continuous coating comprises a water-in-oil emulsion or an oil-in-water-in-oil emulsion.

8. A composition, the composition comprising:

a puffable food element; and an edible emulsion that comprises one or more fluid components, the edible emulsion being a water-in-oil emulsion or an oil-in-water-in-oil emulsion, the puffable food element located in coating relation with the edible emulsion, and about 35 grams of the edible emulsion exhibiting less than about 2 grams of fluid component leakage during a 48 hour period when the edible emulsion is held at a temperature of about 72° F.

9. The composition of claim 8 wherein about 35 grams of the edible emulsion exhibits less than about 1 gram of fluid component leakage during a 48 hour period when the edible emulsion is held at a temperature of about 100° F.

10. The composition of claim 8 wherein the puffable food element comprises puffable food pellets, the puffable food pellets comprising raw grain.

11. The composition of claim 10 wherein the raw grain is selected from the group consisting of corn, rice, oats, wheat, milo, sorghum, millet, and any of these in any combination.

12. The composition of claim 8 wherein the puffable food element comprises raw poppable corn kernels.

13. A composition, the composition comprising:

a puffable food component; and a coating blend, the puffable food component located in coating relation with the coating blend, the coating blend comprising:

fat or oil; and an aqueous component, the aqueous component present in the coating blend as droplets having a maximum diameter of about 30 micrometers, the coating blend effective for forming a fat continuous coating on a puffed form of the puffable food component upon application of energy to the composition that is sufficient to puff the puffable food component.

14. The composition of claim 13 wherein the droplets of the aqueous component have a median diameter in the range of about 5 micrometers to about 10 micrometers.

15. The composition of claim 13 wherein the coating blend further comprises a sweetener.

16. The composition of claim 13 wherein the puffable food component comprises raw grain kernels.

17. The composition of claim 16 wherein the raw grain kernels are selected from the group consisting of corn, rice, oats, wheat, milo, sorghum, millet, and any of these in any combination.

18. The composition of claim 13 wherein the puffable food component comprises raw poppable corn kernels.

19. A composition, the composition comprising:

a puffable food component; and a coating blend, the puffable food component located in coating relation with the coating blend, the coating blend comprising:

fat or oil;

water;

a sweetener; and a flavor additive, the flavor additive isolated from the sweetener and from the puffable food component and the sweetener isolated from the flavor additive and from the puffable food component.

20. The composition of claim 19 wherein the puffable food component comprises pellets of raw grain.

21. The composition of claim 19 wherein the puffable food component comprise raw poppable corn kernels.

22. The composition of claim 19 wherein the puffable food component comprises puffable dough pellets.

23. A puffable food composition, the puffable food composition comprising:
   a puffable food component; and
   a coating blend, the puffable food component located in coating relation with the coating blend, the coating blend comprising:
      fat or oil;
      water;
      a sweetener; and
      a flavor additive, the coating blend in coating relation with the puffable food component and the coating blend effective for forming a coating on puffed forms of the puffable food component, the coating exhibiting stability against degradation after storage at a temperature of at least about 70° F. during a storage period of at least about six months.

24. The composition of claim 23 wherein the coating exhibits no color degradation after storage at a temperature of at least about 70° F. during a storage period of at least about six months.

25. The composition of claim 23 wherein the coating exhibits no flavor degradation after storage at a temperature of at least about 70° F. during a storage period of at least about six months.

26. The composition of claim 23 wherein the puffable food component comprises pellets of raw grain.

27. The composition of claim 23 wherein the puffable food component comprise raw poppable corn kernels.

28. A method of making a coated puffed food product, the method comprising:
   forming an edible emulsion, the edible emulsion being a water-in-oil emulsion or an oil-in-water-in-oil emulsion and the edible emulsion comprising a sweetening agent;
   placing the edible emulsion and a puffable food component in coating relation with each other; and
   applying energy to the edible emulsion and to the puffable food component, the applied energy effective to transform the puffable food component into a puffed food component while transforming the edible emulsion into a coating on the puffed food component to form the coated puffed food product.

29. The method of claim 28 wherein the edible emulsion comprises:
   water;
   fat or oil; and
   the sweetening agent, the concentration of the sweetening agent, based upon the dry weight of the sweetening agent, in the edible emulsion, based upon the total weight of the edible emulsion, ranging from about 40 weight percent to about 70 weight percent.

30. The method of claim 28 wherein the puffable food component comprises raw poppable corn kernels.

31. A method of making a coated puffed food product, the method comprising:
   forming a coating blend, the coating blend comprising a sweetening agent;
   placing the coating blend and a puffable food component in coating relation with each other; and
   applying energy to the coating blend and to the puffable food component, the applied energy effective to transform the puffable food component into a puffed food component while transforming the edible emulsion into a fat continuous coating on the puffed food component to form the coated puffed food product, the fat continuous coating comprising water.

32. The method of claim 31 wherein the coating blend comprises:
   water;
   fat or oil; and
   the sweetening agent, the concentration of the sweetening agent, based upon the dry weight of the sweetening agent, in the coating blend, based upon the total weight of the coating blend, ranging from about 40 weight percent to about 70 weight percent.

33. The method of claim 31 wherein the puffable food component comprises raw poppable corn kernels.

34. The method of claim 31, wherein the fat continuous coating comprises a water-in-oil emulsion or an oil-in-water-in-oil emulsion.

35. A method of making a coated puffed food product, the method comprising:
   forming an edible emulsion that comprises one or more fluid components, the edible emulsion being a water-in-oil emulsion or an oil-in-water-in-oil emulsion, about 35 grams of the edible emulsion exhibiting less than about 2 grams of fluid component leakage during a 48 hour period when the edible emulsion is held at a temperature of about 72° F.;
   placing the edible emulsion and a puffable food element in coating relation with each other; and
   applying energy to the edible emulsion and to the puffable food element, the applied energy effective to transform the puffable food element into a puffed food element while transforming the edible emulsion into a coating on the puffed food element to form the coated puffed food product.

36. The method of claim 35 wherein about 35 grams of the edible emulsion exhibits less than about 1 gram of fluid component leakage during a 48 hour period when the edible emulsion is held at a temperature of about 100° F.

37. The method of claim 35 wherein the puffable food element comprises puffable food pellets, the puffable food pellets comprising raw grain.

38. The method of claim 37 wherein the raw grain is selected from the group consisting of corn, rice, oats, wheat, milo, sorghum, millet, and any of these in any combination.

39. The method of claim 37 wherein the puffable food pellets comprise raw poppable corn kernels.

40. The method of claim 35 wherein forming the edible emulsion comprises:
   heating a fat and an emulsifying agent to form a heated fat phase, the fat heated to a temperature sufficient to remove any memory of crystallization from the fat;
   adding an aqueous solution to the heated fat phase under high shear mixing conditions to form the edible emulsion; and
   crystallizing fat present in the edible emulsion.

41. The method of claim 35 wherein applying energy to the edible emulsion and to the puffable food element comprises applying microwave energy to the edible emulsion and to the puffable food element.

42. A method of making a coated puffed food product, the method comprising:
   forming a coating blend, the coating blend comprising:
      fat; and
      droplets of an aqueous component, the droplets of the aqueous component having a maximum diameter of about 30 micrometers;
   placing the coating blend and a puffable food component in coating relation with each other; and applying energy to the coating blend and to the puffable food component, the applied energy effective to transform the puffable food component into a puffed food component while transforming the coating blend into a fat-continuous coating on the puffed food component to form the coated puffed food product.

43. The method of claim 42 wherein the droplets of the aqueous component have a median diameter in the range of about 5 micrometers to about 10 micrometers.

44. The method of claim 42 wherein the coating blend further comprises a sweetener.

45. The method of claim 42 wherein the puffable food component comprises raw grain kernels.

46. The method of claim 42 wherein the puffable food component comprises raw poppable corn kernels.

47. The method of claim 42 wherein forming the coating blend comprises:
   heating the emulsifying agent and the fat to form a heated fat phase, the fat heated to a temperature sufficient to remove any memory of crystallization from the fat;
   adding an aqueous solution to the heated fat phase under high shear mixing conditions to form the coating blend; and
   crystallizing fat present in the coating blend.

48. The method of claim 42 wherein applying energy to the coating blend and to the puffable food component comprises applying microwave energy to the coating blend and to the puffable food component.

49. A method of making a coated puffed food product, the method comprising:
   forming a coating blend, the coating blend comprising:
      a fat;
      water;
      a sweetener; and
      a flavor additive;
   placing the coating blend and a puffable food component in coating relation with each other, the flavor additive isolated from the sweetener and from the puffable food component and the sweetener isolated from the flavor additive and from the puffable food component; and
   applying energy to the coating blend and to the puffable food component, the applied energy effective to transform the puffable food component into a puffed food component while transforming the coating blend into a coating on the puffed food component to form the coated puffed food product.

50. The method of claim 49 wherein the puffable food component comprises raw grain kernels.

51. The method of claim 49 wherein the puffable food component comprises raw poppable corn kernels.

52. The method of claim 49 wherein forming the coating blend comprises:
   heating the fat and an emulsifying agent to form a heated fat phase, the fat heated to a temperature sufficient to remove any memory of crystallization from the fat;
   adding an aqueous solution to the heated fat phase under high shear mixing conditions to form the coating blend; and
   crystallizing fat present in the coating blend.

53. The method of claim 52, the method further comprising:
   blending a water-soluble form of the flavor additive into the aqueous solution prior to addition of the aqueous solution to the heated fat phase;
   blending an oil-soluble form of the flavor additive into the fat phase prior to addition of the aqueous solution to the fat phase; or
   emulsifying an oil-soluble form of the flavor additive in the aqueous solution prior to addition of the aqueous solution to the heated fat phase.

54. The method of claim 49 wherein applying energy to the coating blend and to the puffable food component comprises applying microwave energy to the coating blend and to the puffable food component.

55. The method of claim 49 wherein the temperature sufficient to remove any memory of crystallization from the fat is preferably at least about 155° F., or more.

56. A method of making a coated puffed food product, the method comprising:
   forming a coating blend, the coating blend comprising:
      fat;
      water; and
      a first potentially reactive additive;
   placing the coating blend and a puffable food component in coating relation with each other; and
   applying energy to the coating blend and to the puffable food component, the applied energy effective to transform the puffable food component into a puffed food component while transforming the coating blend into a coating on the puffed food component to form the coated puffed food product, the coating blend being stable against degradation during storage for a period of at least about six months at a temperature of at least about 70° F.

57. The method of claim 56 wherein the puffable food component comprises raw grain kernels.

58. The method of claim 56 wherein the puffable food component comprises raw poppable corn kernels.

59. The method of claim 56 wherein the coating exhibits no color degradation after storage at a temperature of at least about 70° F. during a storage period of at least about six months.

60. The method of claim 56 wherein the coating exhibits no flavor degradation after storage at a temperature of at least about 70° F. during a storage period of at least about six months.

61. The method of claim 56 wherein forming the coating blend comprises:
   isolating the first potentially reactive additive from contact with the puffable food composition during the period extending from coating blend formation to energy application.

62. The method of claim 61 wherein the coating blend further comprises a second potentially reactive additive and wherein forming the coating blend further comprises:
   isolating the second potentially reactive additive from contact with the puffable food composition during the period extending from coating blend formation to energy application; and
   isolating the second potentially reactive additive from contact with the first potentially reactive additive during the period extending from coating blend formation to energy application.

63. The method of claim 61 wherein forming the coating blend further comprises:
   heating the fat and an emulsifying agent to form a heated fat phase, the fat heated to a temperature sufficient to remove any memory of crystallization from the fat; and
   adding an aqueous solution to the heated fat phase under high shear mixing conditions to form the coating blend.

64. The method of claim 63, the method further comprising:
   blending a water-soluble form of the first potentially reactive additive into the aqueous solution prior to addition of the aqueous solution to the heated fat phase;

blending an oil-soluble form of the first potentially reactive additive into the fat phase prior to addition of the aqueous solution to the fat phase; or emulsifying an oil-soluble form of the first potentially reactive additive in the aqueous solution prior to addition of the aqueous solution to the heated fat phase.

65. A composition, the composition comprising:

a puffable food component; and a coating blend, the coating blend comprising:
  a sweetening agent; and
  water, the concentration of water in the coating blend ranging from about five weight percent to about 40 weight percent, based on the total weight of the coating blend; and wherein the puffable food component is located in coating relation with the coating blend, and the coating blend is effective for forming a fat continuous coating that comprises water on a puffed form of the puffable food component upon application of energy to the composition that is sufficient to puff the puffable food component.

66. The composition of claim 65 wherein the coating blend further comprises fat or oil, the concentration of the sweetening agent, based upon the dry weight of the sweetening agent, in the coating blend, based upon the total weight of the coating blend, ranging from about 40 weight percent to about 70 weight percent.

67. The composition of claim 65 wherein the puffable food component comprises raw poppable corn kernels.

68. A method of making a coated puffed food product, the method comprising:

forming a coating blend, the coating blend comprising
  a sweetening agent; and
  water, the concentration of water in the coating blend ranging from about five weight percent to about 40 weight percent, based on the total weight of the coating blend;

placing the coating blend and a puffable food component in coating relation with each other; and applying energy to the coating blend and to the puffable food component, the applied energy effective to transform the puffable food component into a puffed food component while transforming the [[edible emulsion]] coating blend into a fat continuous coating that comprises water on the puffed food component to form the coated puffed food product.

69. The method of claim 68 wherein the coating blend further comprises fat or oil, the concentration of the sweetening agent, based upon the dry weight of the sweetening agent, in the coating blend, based upon the total weight of the coating blend, ranging from about 40 weight percent to about 70 weight percent.

70. The method of claim 68 wherein the puffable food component comprises raw poppable corn kernels.

* * * * *